US012043050B2

(12) United States Patent
Suhara et al.

(10) Patent No.: US 12,043,050 B2
(45) Date of Patent: Jul. 23, 2024

(54) LIGHT IRRADIATION METHOD, LIGHT ABSORBING MATERIAL ATTACHING APPARATUS, FLYING BODY GENERATING METHOD AND APPARATUS, IMAGE FORMING METHOD, AND THREE-DIMENSIONAL OBJECT PRODUCING METHOD

(71) Applicant: Ricoh Company, Ltd., Tokyo (JP)

(72) Inventors: Hiroyuki Suhara, Kanagawa (JP); Jun Aoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 3 days.

(21) Appl. No.: 17/329,242

(22) Filed: May 25, 2021

(65) Prior Publication Data

US 2021/0370702 A1    Dec. 2, 2021

(30) Foreign Application Priority Data

May 27, 2020    (JP) .................................. 2020-092267
Jun. 18, 2020    (JP) .................................. 2020-105485

(51) Int. Cl.
  *B41M 5/26*    (2006.01)
  *B29C 64/112*    (2017.01)
  (Continued)

(52) U.S. Cl.
  CPC ........... *B41M 5/267* (2013.01); *B29C 64/112* (2017.08); *B29C 64/141* (2017.08); *B33Y 10/00* (2014.12); *B41J 2/14104* (2013.01); *B41M 5/00* (2013.01)

(58) Field of Classification Search
  CPC .................................................. B41J 2/14104
  See application file for complete search history.

(56) References Cited

U.S. PATENT DOCUMENTS 5,834,766 A    11/1998 Suhara
6,376,837 B1    4/2002 Itabashi et al.
(Continued)

FOREIGN PATENT DOCUMENTS

EP    3521483 A1 *    8/2019    ............. B23K 26/02
JP    08-072252    3/1996
(Continued)

OTHER PUBLICATIONS

P. Serra and A. Pique, "Laser-induced forward transfer: Fundamentals and applications," Adv. Mater. Technol. 4, (2019) 1800099.
(Continued)

*Primary Examiner* — Alex A Rolland
(74) *Attorney, Agent, or Firm* — XSENSUS LLP

(57) ABSTRACT

Provided is light irradiation method for irradiating a light absorbing material with light beam having wavelength absorbable by light absorbing material, including applying to light absorbing material, energy that enables light absorbing material to fly, by pressure in a vaporized region higher than or equal to outside pressure, wherein vaporized region is present at interface between a transparent body and light absorbing material in a manner to surround an optical axis. Also provided is flying body generating method including irradiating a surface of a base material opposite to a surface over which light absorbing material is disposed with laser beam to fly light absorbing material in an emitting direction of laser beam, wherein vaporized region having pressure higher than or equal to outside pressure is generated along outer circumference of a region irradiated with laser beam at interface between base material and light absorbing material.

11 Claims, 22 Drawing Sheets

(51) Int. Cl.
  *B29C 64/141* (2017.01)
  *B33Y 10/00* (2015.01)
  *B41J 2/14* (2006.01)
  *B41M 5/00* (2006.01)

(56) References Cited

U.S. PATENT DOCUMENTS

| | | | |
|---|---|---|---|
| 6,400,391 B1 | 6/2002 | Suhara et al. | |
| 6,555,810 B1 | 4/2003 | Suhara | |
| 6,870,652 B2 | 3/2005 | Suhara et al. | |
| 10,362,683 B2 | 7/2019 | Alloncle et al. | |
| 2001/0048542 A1 | 12/2001 | Suhara | |
| 2002/0163571 A1 | 11/2002 | Suhara et al. | |
| 2003/0063358 A1 | 4/2003 | Suhara | |
| 2005/0128615 A1 | 6/2005 | Suhara et al. | |
| 2006/0262417 A1 | 11/2006 | Suhara | |
| 2009/0051982 A1 | 2/2009 | Suhara | |
| 2010/0196052 A1 | 8/2010 | Suhara | |
| 2014/0253658 A1 | 9/2014 | Suhara et al. | |
| 2015/0042740 A1 | 2/2015 | Suhara et al. | |
| 2015/0331351 A1 | 11/2015 | Suhara et al. | |
| 2015/0355568 A1 | 12/2015 | Tachibana et al. | |
| 2016/0004181 A1 | 1/2016 | Suhara et al. | |
| 2017/0348872 A1* | 12/2017 | Suzuki | B41J 2/14104 |
| 2017/0368822 A1 | 12/2017 | Guillemot | |
| 2020/0298440 A1 | 9/2020 | Aoto et al. | |
| 2020/0379251 A1 | 12/2020 | Suhara et al. | |

FOREIGN PATENT DOCUMENTS

| | | |
|---|---|---|
| JP | 08-310019 | 11/1996 |
| JP | 6455588 | 12/2018 |
| JP | 2020-157751 | 10/2020 |
| JP | 2020-196196 | 12/2020 |
| JP | 2021-054042 | 4/2021 |
| JP | 2021-054052 | 4/2021 |
| WO | WO2016/136722 A1 | 9/2016 |
| WO | 2018/193454 A1 | 10/2018 |

OTHER PUBLICATIONS

H. J. J. Staat, A. Bos, M. Berg, H. Reinten, H. Wijshoff, M. Versluis and D. Lohse, "Ultrafast imaging method to measure surface tension and viscosity of inkjet-printed droplets in flight," Exp Fluids (2017) 58:2.

D. G. Foster, "Thermal Printing for Digital Output," Society for Imaging Science and Technology (2009) p. 68.

J Miksys, G Arutinov, G Roemer, "Pico-to nanosecond pulsed laser-induced forward transfer (LIFT) of silver nanoparticle inks: a comparative study," Applied Physics A, (2019) 125:814.

L. Rapp, J. Ailuno, A. P. Alloncle and P. Delaporte, "Pulsed-laser printing of silver nanoparticles ink: control of morphological properties," Opt. Express 19 (2011) 21563-74.

E. Turkoz, L. Deike and C. B. Arnold, "Comparison of jets from Newtonian and non-Newtonian fluids induced by blister-actuated laser-induced forward transfer (BA-LIFT)," Appl. Phys. A (2017) 123:652.

K. Otomo, T. Hibi, Y. Kozawa, M. Kurihara, N. Hashimoto, H. Yokoyama, S. Sato, and T. Nemoto, "Two-photon excitation STED microscopy by utilizing transmissive liquid crystal devices," Opt. Express 22(23), (2014) 28215-28221.

K. Sueda, G. Miyaji, N. Miyanaga, and M. Nakatsuka, "Laguerre-Gaussian beam generated with a multilevel spiral phase plate for high intensity laser pulses," Opt. Express 12, (2004), 3548-3553.

R. Nakamura, H. Kawaguchi, M. Iwata, A. Kaneko, R. Nagura, S. Kawano, K. Toyoda, K. Miyamoto and T. Omatsu, "Optical vortex-induced forward mass transfer: manifestation of helical trajectory of optical vortex," Opt. Express 27 (2019) 38019.

M. S. Brown, C. F. Brasz, Y. Ventikos and C. B. Arnold, "Impulsively actuated jets from thin liquid films for high resolution printing applications," J Fluid Mech 709, (2012), 341-370.

K. Yum and M. Yu, "Measurement of wetting properties of individual boron nitride nanotubes with the Wilhelmy method using a nanotube-based force sensor," Nanoletters, 6 (2) (2006), pp. 329-333.

Extended European Search Report issued Jan. 18, 2022 in European Patent Application No. 21175670.5, 10 pages.

\* cited by examiner

1mm

LIGHT IRRADIATION METHOD, LIGHT ABSORBING MATERIAL ATTACHING APPARATUS, FLYING BODY GENERATING METHOD AND APPARATUS, IMAGE FORMING METHOD, AND THREE-DIMENSIONAL OBJECT PRODUCING METHOD

CROSS-REFERENCE TO RELATED APPLICATIONS

The present application claims priority under 35 U.S.C. § 119 to Japanese Patent Application No. 2020-092267 filed May 27, 2020 and Japanese Patent Application No. 2020-105485 filed Jun. 18, 2020. The contents of which are incorporated herein by reference in their entirety.

BACKGROUND OF THE INVENTION

Field of the Invention

The present disclosure relates to a light irradiation method, a light absorbing material attaching apparatus, a flying body generating method and apparatus, an image forming method, and a three-dimensional object producing method.

Description of the Related Art

Because image forming apparatuses can fly ink droplets to desired positions, studies have been recently made into application of image forming apparatuses to the field of 3D printers that produce three-dimensional objects, and to the field of printed electronics for producing electronic parts by printing techniques.

Specifically, there is a need for flying various materials, not only low-viscosity inks used in existing image formation, accurately to desired positions, and various image forming apparatuses have been proposed.

For example, a proposed method flies an ink that is vaporized by irradiation with laser (for example, see Japanese Unexamined Patent Application Publication No. 08-072252).

For example, a proposed laser-induced forward transfer (LIFT) method uses an optical vortex laser (for example, see International Publication No. WO 2016/136722). The LIFT method forms a film (layer) of a transfer target material (hereinafter, may be referred to as flying target) over a (donor) substrate, and irradiates the film (layer) of the flying target with laser to fly the flying target and locate the flying target at a desired position of an acceptor substrate disposed counter to the flying target. The LIFT method provides applications such as three-dimensional printing, printed electronic equipment for solar cells, biomaterial printing, and functional printing (for example, see P. Serra and A. Pique, "Laser-induced forward transfer: Fundamentals and applications," Adv. Mater. Technol. 4, (2019) 1800099).

SUMMARY OF THE INVENTION

According to an aspect of the present disclosure, a light irradiation method for irradiating a light absorbing material for absorbing light with a light beam having a wavelength absorbable by the light absorbing material includes applying to the light absorbing material, energy that enables the light absorbing material to fly, by a pressure in a vaporized region higher than or equal to an outside pressure, where the vaporized region is present at an interface between a transparent body and the light absorbing material in a manner that the vaporized region surrounds an optical axis.

Figure 1A:
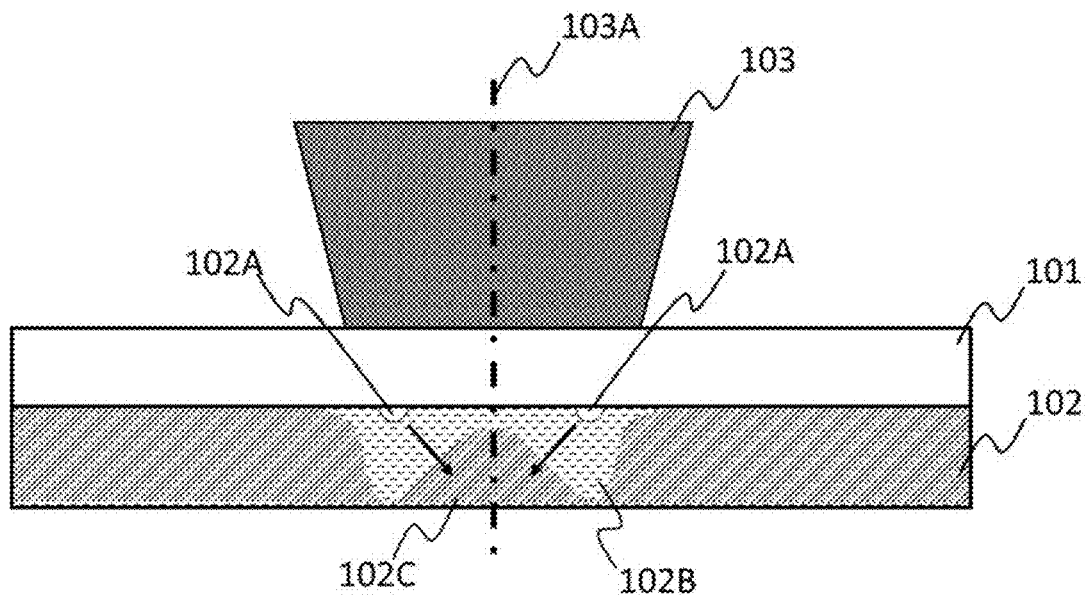
FIG. 1A is a conceptual view illustrating an example for describing a flying body generating method of the present disclosure.

DESCRIPTION OF THE EMBODIMENTS (Light Irradiation Method and Light Absorbing Material Attaching Apparatus)

A light irradiation method of the present disclosure is a method for irradiating a light absorbing material for absorbing light with a light beam having a wavelength absorbable by the light absorbing material, and includes applying to the light absorbing material, energy that enables the light absorbing material to fly, by a pressure in a vaporized region higher than or equal to an outside pressure, where the vaporized region is present at an interface between a transparent body and the light absorbing material in a manner that the vaporized region surrounds an optical axis. The light irradiation method further includes other steps as needed.

A light absorbing material attaching apparatus of the present disclosure includes a light absorbing material for absorbing light, a unit configured to irradiate the light absorbing material with a light beam having a wavelength absorbable by the light absorbing material, and a unit configured to convert a phase distribution of an incident laser beam wavefront for conversion to a desired beam profile.

The light absorbing material attaching apparatus includes a vaporized region having a pressure higher than or equal to an outside pressure at an interface between a transparent body and the light absorbing material in a manner that the vaporized region surrounds an optical axis. The light absorbing material attaching apparatus applies to the light absorbing material, energy that enables the light absorbing material to fly, by the pressure in the vaporized region, to make the light absorbing material land on an attaching target that is apart by at least 0.5 mm or greater. The light absorbing material attaching apparatus further includes other units as needed.

The light irradiation method of the present disclosure is approximately the same as the flying body generating method of the present disclosure. Hence, the light irradiation method of the present disclosure will be described through description of the flying body generating method and the flying body generating apparatus of the present disclosure. The light absorbing material attaching apparatus of the present disclosure is approximately the same as the image forming apparatus of the present disclosure. Hence, the light absorbing material attaching apparatus of the present disclosure will be described through description of the image forming apparatus of the present disclosure.

(Flying Body Generating Method and Flying Body Generating Apparatus)

The flying body generating method of the present disclosure includes a light absorbing material flying step of irradiating a surface of a base material opposite to a surface over which a light absorbing material is disposed with a laser beam to fly the light absorbing material in an emitting direction of the laser beam. The flying body generating method generates a vaporized region having a pressure higher than or equal to an outside pressure at an interface between the base material and the light absorbing material in a manner that the vaporized region surrounds an optical axis of the laser beam emitted. The flying body generating method further includes other steps as needed.

The flying body generating apparatus of the present disclosure includes a light absorbing material flying unit configured to irradiate a surface of a base material opposite to a surface over which a light absorbing material is disposed with a laser beam to fly the light absorbing material in an emitting direction of the laser beam. The flying body generating apparatus generates a vaporized region having a pressure higher than or equal to an outside pressure at interface between the base material and the light absorbing material in a manner that the vaporized region surrounds an optical axis of the laser beam emitted. The flying body generating apparatus further includes other units as needed.

The flying body generating method of the present disclosure can be suitably performed by the flying body generating apparatus of the present disclosure. The light absorbing material flying step can be suitably performed by the light absorbing material flying unit. The other steps can be suitably performed by the other units.

A "flying body" means a flying object that is generated by irradiating the light absorbing material with the laser beam. Flying means a state from when the light absorbing material departs the base material until when the light absorbing material contacts another substance.

The flying body has different shapes depending on the constituent material of the light absorbing material. For example, an approximately spherical shape is preferable as the flying body when the light absorbing material is a liquid. An arbitrary shape such as a flat shape and a particulate shape is preferable as the flying body when the light absorbing material is a solid. Liquid or solid means the state of the light absorbing material in an environment (e.g., temperature and pressure) in which the flying body is generated.

The present inventors have studied the following problems of existing techniques.

Digital printing techniques are applied not only to the field of 2D printers but also to the field of 3D printers and print electronics (EP). Inkjet printers (IJ) (for example, see H. J. J. Staat, A. Bos, M. Berg, H. Reinten, H. Wijshoff, M. Versluis and D. Lohse, "Ultrafast imaging method to measure surface tension and viscosity of inkjet-printed droplets in flight," Exp Fluids (2017) 58:2), thermal printers (TP) (for example, see D. G. Foster, "Thermal Printing for Digital Output," Society for Imaging Science and Technology (2009) p 68), and electrophotography (EP) are commercialized as digital printing techniques. These products have already acquired high reliability and customer satisfaction. Inkjet printing systems have a high image quality and a good performance. However, inkjet printing systems cannot be applied to high-viscosity inks because of clogging of nozzles with the inks. TP and EP systems can be applied to high-viscosity materials, but have many constraints in terms of sheet shapes and receiver materials such as heat resistant materials.

For example, existing techniques employing inkjet systems need a greater nozzle diameter as the ink viscosity is higher, leading to a lower resolution because a greater nozzle diameter relatively increases the diameter of an ink droplet discharged. Therefore, it may be difficult to apply inkjet systems.

Existing techniques also have a problem of difficulty controlling the ink landing position, because the highest energy of a laser beam of common Gauss lasers is distributed at the optical axis of the laser beam and the flying target ink scatters when irradiated with such a laser beam.

Existing LIFT methods using a Laguerre-Gaussian beam such as an optical vortex laser can improve the accuracy of the landing position of the light absorbing material to be flown, compared with when a Gaussian beam is used, but may have difficulty controlling the landing position more accurately.

When employing existing LIFT methods, it is known to be necessary to make the gap between a donor substrate and a receiver substrate small in order to prevent printing quality degradation in the LIFT system. For example, there are many reports on a short gap of some tens of micrometers or less (for example, see J Miksys, G Arutinov, G Roemer, "Pico-to nanosecond pulsed laser-induced forward transfer (LIFT) of silver nanoparticle inks: a comparative study," Applied Physics A, (2019) 125:814). The gap is preferably 500 micrometers or greater in order to increase the throughput in industrial applications. A gap that can be applied to bossed-recessed acceptors or shapes having a curved surface is preferably 1,000 micrometers or greater. It has been reported that satellites or spray may generally occur when the gap is 100 micrometers or greater (for example, see L. Rapp, J. Ailuno, A. P. Alloncle and P. Delaporte, "Pulsed-laser printing of silver nanoparticles ink: control of morphological properties," Opt. Express 19 (2011) 21563-74). It has been reported that there is a need for adding a highly laser wavelength-absorbable film in order to improve the quality of a liquid droplet, (for example, see E. Turkoz, L. Deike and C. B. Arnold, "Comparison of jets from Newtonian and non-Newtonian fluids induced by blister-actuated laser-induced forward transfer (BA-LIFT)," Appl. Phys. A (2017) 123:652).

The flying body generating method of the present disclosure is based on a finding that the LIFT method can improve the landing position accuracy by irradiating a flying target light absorbing material with a laser beam in a manner that a vaporized region having a pressure higher than or equal to an outside pressure is generated along an outer circumference of a region of the light absorbing material irradiated with the laser beam at an interface between the base material and the light absorbing material.

Japanese Unexamined Patent Application Publication No. 08-072252 mentioned above is the same as the present disclosure in irradiating an ink with a laser to vaporize and fly the ink, but is different from the present disclosure in that a component such as a discharging port or an inner wall surface (so-called nozzle) that restricts the flying direction is present and in entirely vaporizing the ink and flying the ink.

International Publication No. WO 2016/136722 mentioned above is different from the present disclosure in using an optical vortex laser and transforming optical vortex energy to a radiation pressure force to fly the light absorbing material.

It has been found that the light irradiation method and the flying body generating method of the present disclosure are excellent in the landing position accuracy of the light absorbing material even when the light absorbing material flies a long-distance flight over a gap of 500 micrometers or greater between a donor substrate and a receiver substrate.

The present disclosure has an object to provide a light irradiation method excellent in landing position accuracy.

The present invention can provide a light irradiation method excellent in landing position accuracy.

<Light Absorbing Material Flying Step and Light Absorbing Material Flying Unit>

The light absorbing material flying step is a step of irradiating a surface of a base material opposite to a surface over which a light absorbing material is disposed with a laser beam to fly the light absorbing material in an emitting direction of the laser beam.

The light absorbing material flying unit is a unit configured to irradiate a surface of a base material opposite to a surface over which a light absorbing material is disposed with a laser beam to fly the light absorbing material in an emitting direction of the laser beam.

The flying body generating method and apparatus of the present disclosure generate a vaporized region having a pressure higher than or equal to an outside pressure along an outer circumference of a region irradiated with the laser beam at an interface between the base material and the light absorbing material. That is, the flying body generating method and apparatus generate a vaporized region having a pressure higher than or equal to an outside pressure at an interface between the base material and the light absorbing material in a manner that the vaporized region surrounds an optical axis of the laser beam emitted.

In the present disclosure, "an outer circumference of a region irradiated with the laser beam" means a region that does not include the center of gravity (center) of the (shape of) the region irradiated with the laser beam.

In the present disclosure, "an optical axis" means the axis of a laser beam emitted. More specifically, in the present disclosure, "an optical axis" may be the center of an inscribed circle of a figure obtained in a cross-section of the laser beam taken in a direction orthogonal to an emitting direction of the laser beam emitted.

"To surround an optical axis" means presence in a peripheral region surrounding the optical axis, but not on the "optical axis". Here, the peripheral region surrounding the optical axis means a region that does not include the center of gravity (center) of the (shape of) the region irradiated with the laser beam.

Next, "a vaporized region having a pressure higher than or equal to an outside pressure" will be described.

For example, a risen temperature at which a light absorbing material in a room temperature environment starts to vaporize is assumed to be Tb (K). In this case, when the light absorbing material is irradiated with light (laser beam) in a manner that the formula (1) below is satisfied, the light absorbing material comes to have a pressure higher than or equal to an outside pressure and vaporize, and can generate a vaporized region having a pressure higher than or equal to the outside pressure. Here, when an open system is assumed, the "outside pressure" means the atmospheric pressure.

$$Q \geq Tb(v \cdot c \cdot \rho) \quad \text{Formula (1)}$$

Here, v represents volume (kg), c represents specific heat (J/(kg·K)), and ρ represents density (kg/m$^3$).

Here, Q (J) is a heat input, not the amount of irradiation energy of light. Taking into consideration the light energy absorptivity or coefficient of absorption of the light absorbing material, it is possible to obtain the amount of irradiation energy (energy density) of light needed to generate a vaporized region having a pressure higher than or equal to an outside pressure.

Next, "generating a vaporized region having a pressure higher than or equal to an outside pressure along an outer circumference of a region irradiated with the laser beam at an interface between the base material and the light absorbing material" will be specifically described with reference to FIG. 1A to FIG. 1D.

FIG. 1A to FIG. 1D illustrate an example of a case where an annular laser beam having an amount of energy (energy density) satisfying the formula (1) above is emitted as a laser beam with which a surface of the base material opposite to a surface over which the light absorbing material is disposed is irradiated.

Figure 1B:
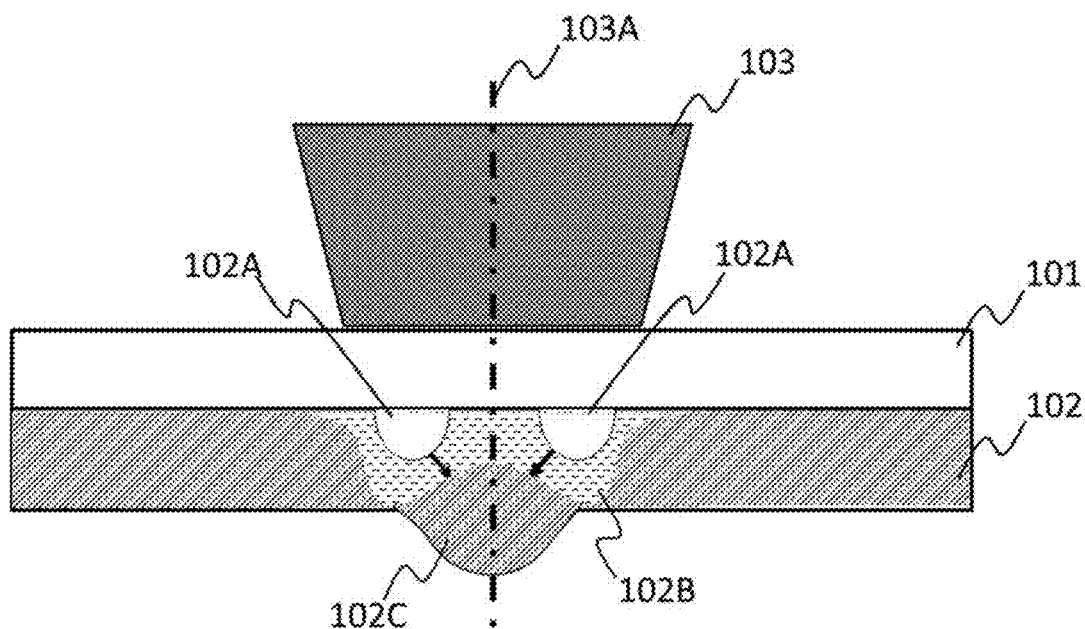
FIG. 1B is a conceptual view illustrating another example for describing a flying body generating method of the present disclosure.
Figure 1C:
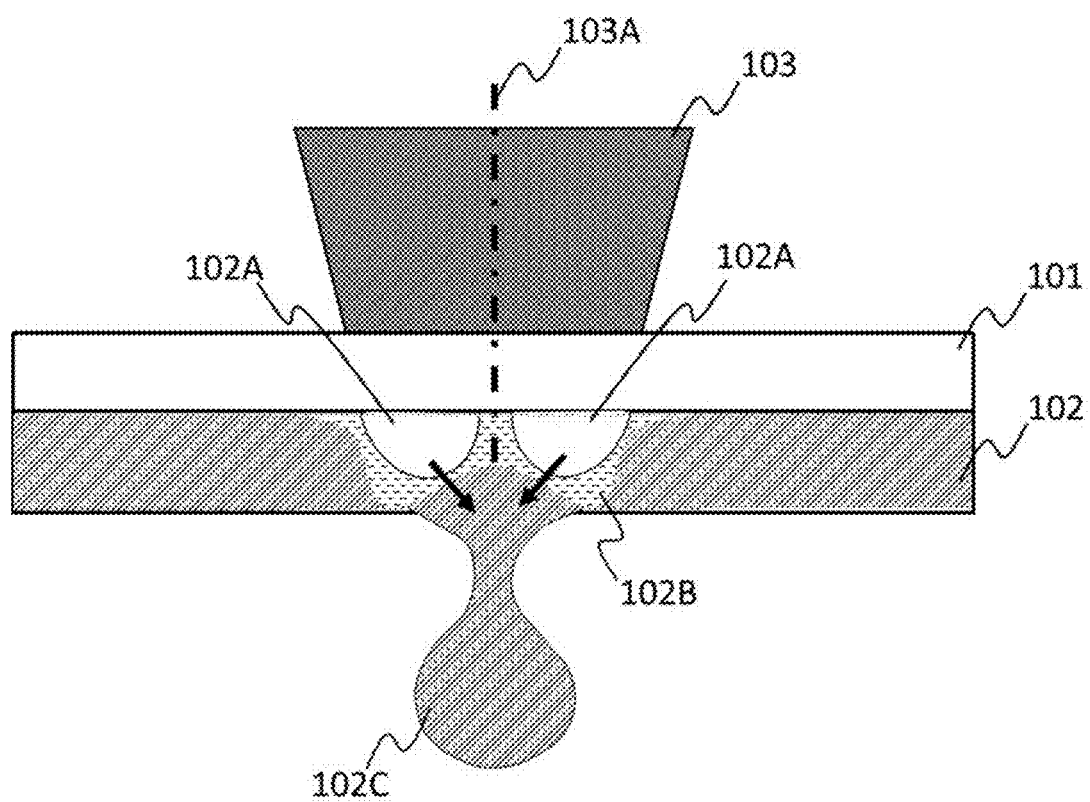
FIG. 1C is a conceptual view illustrating another example for describing a flying body generating method of the present disclosure.
Figure 1D:
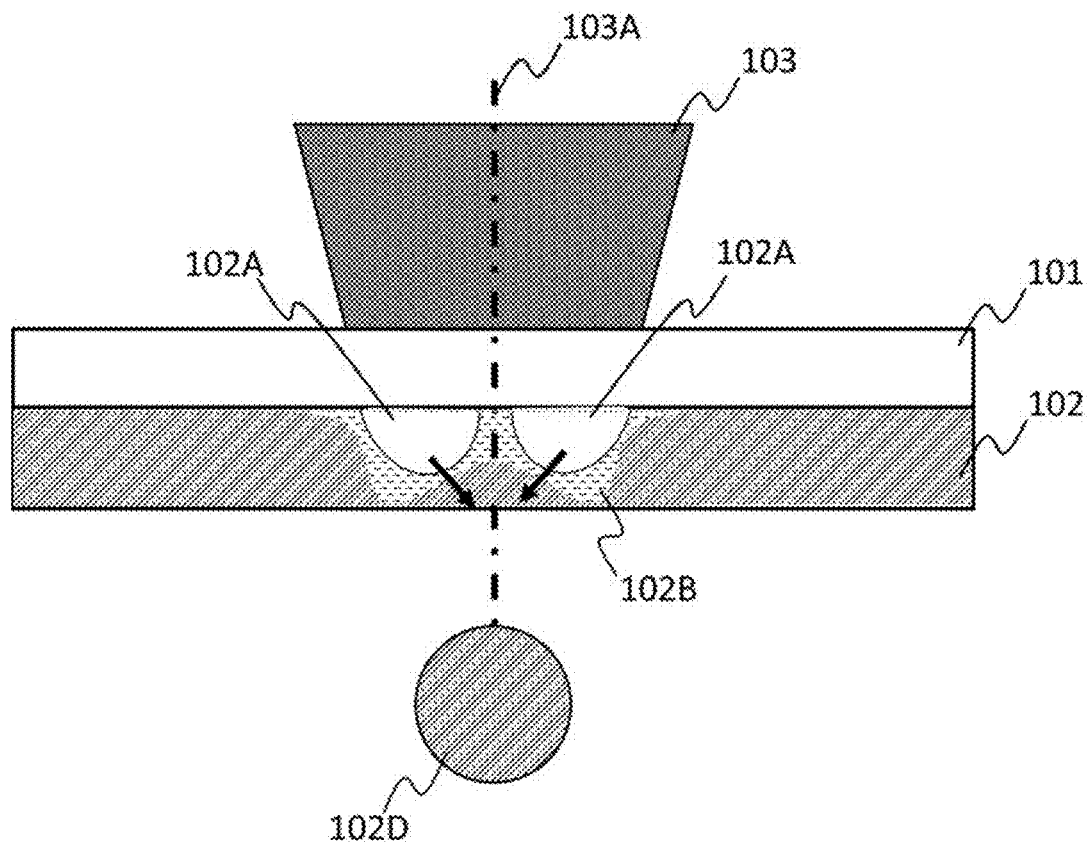
FIG. 1D is a conceptual view illustrating another example for describing a flying body generating method of the present disclosure.

As illustrated in FIG. 1A, the light absorbing material flying step irradiates a surface of a base material 101 in a donor substrate opposite to a surface over which a light absorbing material 102 is disposed with a laser beam 103. Here, the light absorbing material 102 irradiated with the laser beam 103 forms a viscosity-lowered region 102B. A vaporized region 102A, which is the light absorbing material 102 vaporized, is generated at the interface between the base material 101 and the light absorbing material 102 in a manner that the vaporized region 102A surrounds the optical axis. The generated vaporized region 102A expands as illustrated in FIG. 1B and FIG. 1C. Through expansion of the generated vaporized region 102 in this way, a pressure toward the optical axis is generated as indicated by arrows in FIG. 1A to FIG. 1C. This inward pressure (or a pressure toward the optical axis) pushes out the light absorbing material 102C surrounded by the viscosity-lowered light absorbing material 102B in the emitting direction of the laser beam, and eventually a liquid droplet 102D formed of the light absorbing material flies in the emitting direction of the laser beam as illustrated in FIG. 1D.

As described above, through irradiation of the light absorbing material with a laser beam in a manner that "a vaporized region having a pressure higher than or equal to the outside pressure is generated along an outer circumference of a region irradiated with the laser beam at the interface between the base material and the light absorbing material", the light absorbing material near the optical axis receives a pressure to enclose the light absorbing material on the optical axis, making it possible to generate a flying body without scattering.

In the following description, the vaporized region having a pressure higher than or equal to the outside pressure along the outer circumference of the region irradiated with the laser beam at the interface between the base material and the light absorbing material may be referred to as "bubble ring", and the method for applying to the light absorbing material, energy that enables the light absorbing material to fly by the "bubble ring" may be referred to as bubble ring method (BR method). A BR method that uses a laser may be referred to as BR-LIFT.

Existing LIFT methods using a Gaussian beam generate a vaporized region on the optical axis. Therefore, there acts a force that prompts scattering from the optical axis, to make the light absorbing material scatter, making it difficult to control the landing position.

Optical vortex lasers serving as Laguerre Gaussian beams fly the light absorbing material utilizing, for example, an orbital angular momentum inherent to the optical vortex lasers or a force of radiation pressure. Therefore, optical vortex lasers have a different principle from the BR method.

The overview of the BR-LIFT optical system of the present disclosure will be described with reference to the drawings.

It is preferable that a light source used in BR-LIFT have a high-quality beam profile and a high output power. Hence, it is preferable to use a nanosecond pulse fiber laser based on a main oscillator power amplifier (MOPA) laser system, as a laser light source unit having a wavelength of 1,064 nm. A prototype MOPA laser is formed of a two-stage preamplifier and a main amplifier. The output energy of a pulse laser reaches 0.2 mJ at a pulse recurrence rate of 50 kHz. The pulse laser passes through a spatial isolator, a λ/4 plate, a collimator lens, and an acoustooptic deflector. An AOM acts to control the recurrence rate of the pulse laser. Next, the laser passes through a nonlinear optical crystal and causes a second harmonic generation (SHG). SHG acts to convert the wavelength of 1,064 nm to a wavelength of 532 nm.

Figure 11A:
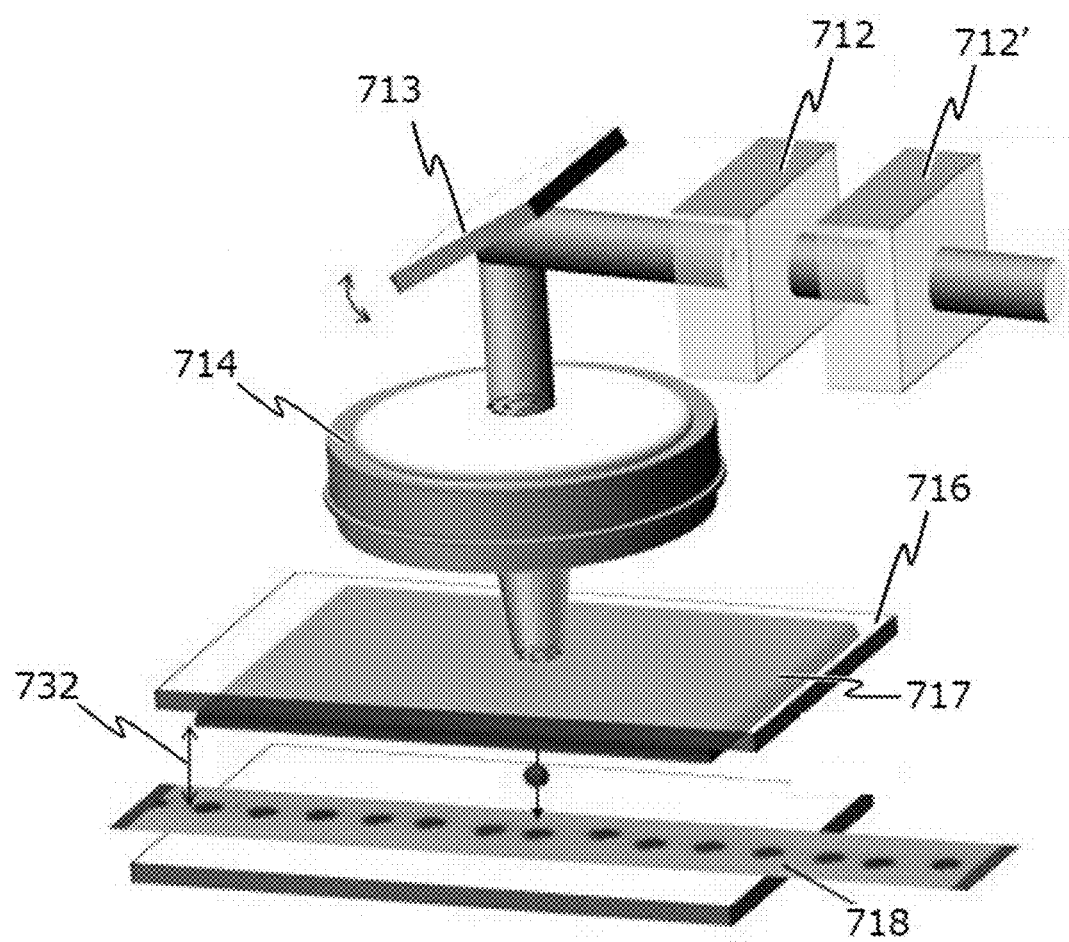
FIG. 11A is an exemplary view illustrating an example of a flying body generating apparatus of the present disclosure.

FIG. 11A illustrates an optical system for irradiating a donor layer with a pulse laser having a wavelength of 532 nm. The laser beam is shaped by a beam size/wavefront converter 21, and then transformed into an annular beam. In order to generate a bubble ring, the shaped laser beam is converted to a desired beam profile by passing through an optical element that can convert the laser beam to the desired beam profile. Next, the laser beam passes through a mirror and another optical element and is deflected by a galvano scanner. Finally, the laser beam is focused on the donor layer through a f0 lens. The donor material is applied over a transparent substrate. The receiver is disposed at the back side of the donor layer in parallel with the donor layer, and is disposed over an adjustable stage.

There are some methods for generating an annular beam. Common methods include a geometric optical method using a lens and a wavelength optical method using a diffraction element. As a method for transforming a Gaussian beam into a specific beam, a known method uses spatial light modulators such as an axicon lens, a diffractive optical element, and a liquid crystal. Generation of an annular beam using an axicon lens is described as follows. When the apex angle of an axicon lens is α, the radius R0 of the ring of the annular beam is expressed as follows.

$$R0(n-1)aF \qquad \text{(Formula A)}$$

In Formula A, n represents a refractive index, and F represents a focal length. The apex angle α or the focal length F may be changed in order to define R0. R0 may also be defined by changing the distance between the axicon lens and a condenser lens. Another method generates a wavefront transformed into an annular beam, using a SLM (for example, see K. Otomo, T. Hibi, Y. Kozawa, M. Kurihara, N. Hashimoto, H. Yokoyama, S. Sato, and T. Nemoto, "Two-photon excitation STED microscopy by utilizing transmissive liquid crystal devices," Opt. Express 22(23), (2014) 28215-28221).

Another method generates a Laguerre Gaussian beam, using a phase plate or a cylindrical lens (for example, see K. Sueda, G. Miyaji, N. Miyanaga, and M. Nakatsuka, "Laguerre-Gaussian beam generated with a multilevel spiral phase plate for high intensity laser pulses," Opt. Express 12, (2004), 3548-3553). FIG. 3 illustrates the calculation results of a Fraunhofer diffraction image when an axicon wavefront having an apex angle α is superimposed on a topological charge L of a Laguerre-Gaussian beam (for example, see R. Nakamura, H. Kawaguchi, M. Iwata, A. Kaneko, R. Nagura, S. Kawano, K. Toyoda, K. Miyamoto and T. Omatsu, "Optical vortex-induced forward mass transfer: manifestation of helical trajectory of optical vortex," Opt. Express 27 (2019) 38019).

The topological charge L expresses a twist number, which is in one wavelength. Because the topological charge L is an integer number, only a discrete ring diameter can be obtained. The ring diameter (the inner diameter of a laser beam) measured at L=1 and α=0 was 45 micrometers, and the ring diameter (the inner diameter of a laser beam) at L=2 and α=0 was 55 micrometers. It is difficult to obtain other ring diameters using only the Laguerre-Gaussian beam.

Figure 5A:
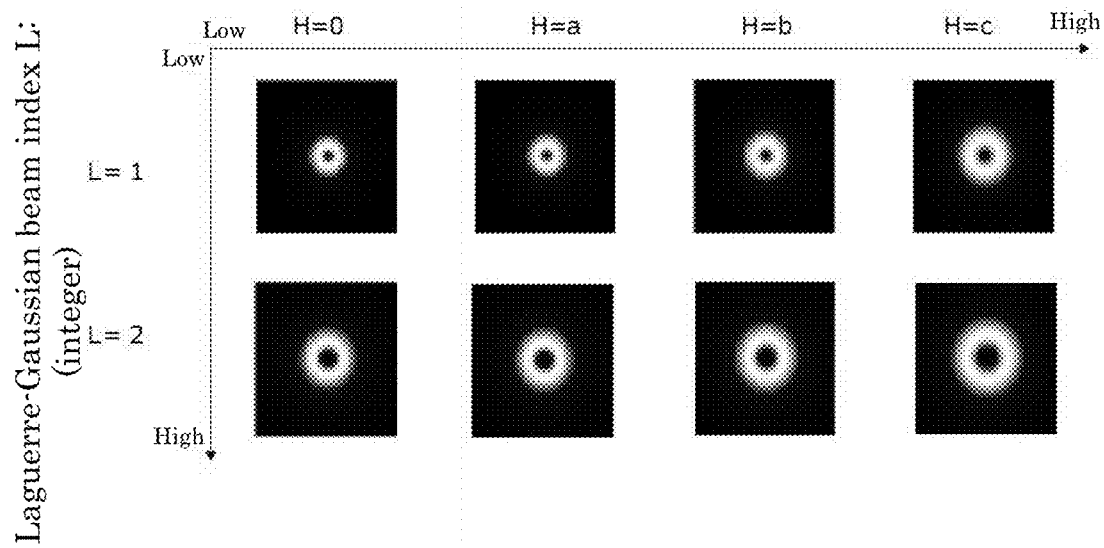
FIG. 5A is a diagram illustrating an example of exposure intensity distributions when a Laguerre-Gaussian beam index L and a conical wavefront height index H are superimposed.

In contrast, the ring diameter can be freely selected because α is a real number. The row direction in FIG. 5A presents the calculation results obtained when α=0, a, 2a, and 4a. The diameter increases with the increasing α. The ring diameter was 125 micrometers when α=4a and L=1, whereas the ring diameter was 135 micrometers when α=4a and L=2. The ring diameter can be arbitrarily established by superimposing the conical wavefront. In addition, the ratio of the inner diameter to the outer diameter can be changed by combining L and α. Therefore, the optimum beam profile can be selected for the donor material.

Next, the light absorbing material flying unit will be described.

As the light absorbing material flying unit, for example, a unit including a laser light source and a laser beam transforming unit can be used. The light absorbing material flying unit further includes a laser beam shaping unit and other units as needed.

—Laser Light Source—

The laser light source is not particularly limited and may be appropriately selected depending on the intended purpose. Examples of the laser light source include a solid-state laser, a gas laser, and a semiconductor laser. A laser light source that can oscillate pulses is preferable.

Examples of the solid-state laser include a YAG laser, and a Ti-sapphire laser.

Examples of the gas laser include an argon laser, a helium neon laser, and a carbon dioxide laser.

The wavelength of the laser beam is not particularly limited, may be appropriately selected depending on the intended purpose, and is preferably 300 nm or greater but 11 micrometers or less and more preferably 350 nm or greater but 1,100 nm or less.

The beam diameter of the laser beam is not particularly limited, may be appropriately selected depending on the intended purpose, and is preferably 10 micrometers or greater but 10 mm or less and more preferably 10 micrometers or greater but 1 mm or less.

The pulse width of the laser beam is not particularly limited, may be appropriately selected depending on the intended purpose, and is preferably 2 nanoseconds or greater but 100 nanoseconds or less and more preferably 2 nanoseconds or greater but 10 nanoseconds or less.

The pulse frequency of the laser beam is not particularly limited, may be appropriately selected depending on the intended purpose, and is preferably 10 Hz or higher but 1 MHz or lower and more preferably 20 Hz or higher but 50 kHz or lower.

Examples of the laser light source include a Nd:YAG laser light source having a wavelength of 1,064 nm.

—Laser Beam—

The laser beam is not particularly limited and may be appropriately selected depending on the intended purpose so long as the laser intensity of the laser beam on the optical axis of the laser beam is lower than the laser intensity of the laser beam in the outer circumference, in other words, so long as the laser beam has a laser intensity distribution in which the laser intensity of the laser beam in a region surrounding the optical axis of the laser beam is higher than the laser intensity of the laser beam on the optical axis of the laser beam. Examples of the laser beam include an annular laser beam.

—Laser Beam Transforming Unit—

The laser beam transforming unit can generate a desired laser beam as the laser beam.

The laser beam transforming unit is not particularly limited and may be appropriately selected depending on the intended purpose. Examples of the laser beam transforming unit include an annular laser beam transforming unit.

Examples of the annular laser beam transforming unit include an axicon lens, a Vortex element, a diffractive optical element (DOE), a spatial light modulator, and a liquid crystal phase conversion element (SLM). One of these elements may be used alone or two or more of these elements may be used in combination.

Figure 2A:
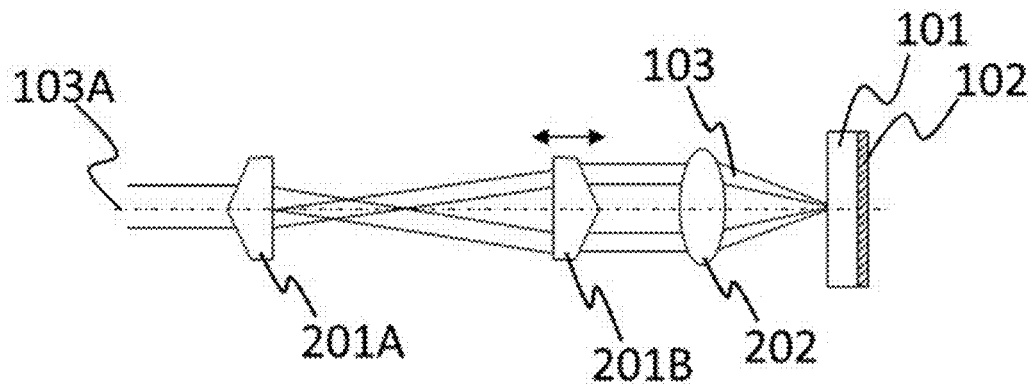
FIG. 2A is an exemplary view illustrating an example when axicon lenses are used as an annular laser beam transforming unit.

FIG. 2A is an exemplary view illustrating an example when axicon lenses are used as the annular laser beam transforming unit. In the example illustrated in FIG. 2A, two axicon lenses 201A and 201B are used as the annular laser beam transforming unit. In this example, the first axicon lens splits a laser beam, and the second axicon lens generates a desired annular beam. The diameter (inner diameter) of the beam can be appropriately changed by adjustment of the distance between the two axicon lenses for adjustment of the composite focal length.

Figure 2B:
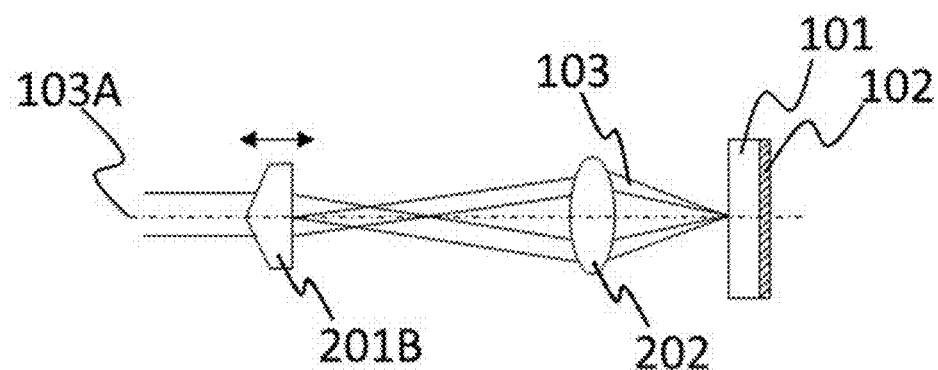
FIG. 2B is an exemplary view illustrating an example when the second axicon lens in FIG. 2A and a condenser lens are used as an annular laser beam transforming unit.

FIG. 2B is an exemplary view illustrating an example when the second axicon lens 201B in FIG. 2A and a condenser lens 202 are used as the annular laser beam transforming unit. In this example, the diameter (inner diameter) of the beam can be appropriately changed by adjustment of the distance between the axicon lens 201B and the condenser lens.

Figure 2C:
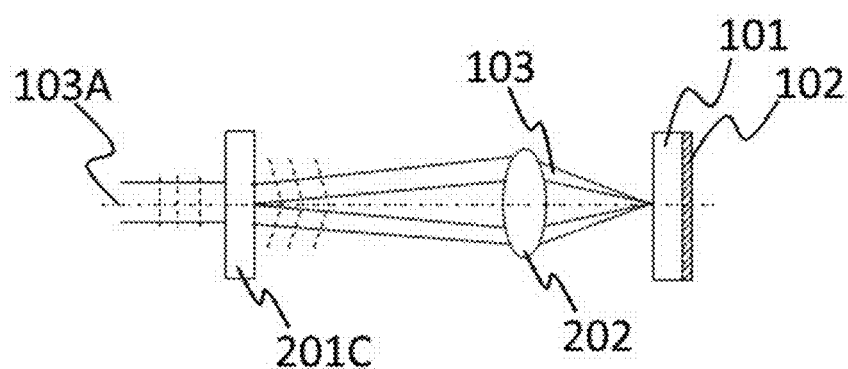
FIG. 2C is an exemplary view illustrating an example when the axicon lens in FIG. 2B is changed to a diffractive optical element (DOE).

FIG. 2C is an exemplary view illustrating an example when the axicon lens in FIG. 2B is changed to a diffractive optical element (DOE) as the annular laser beam transforming unit. Using the DOE, it is possible to form a previously defined wavefront.

Figure 2D:
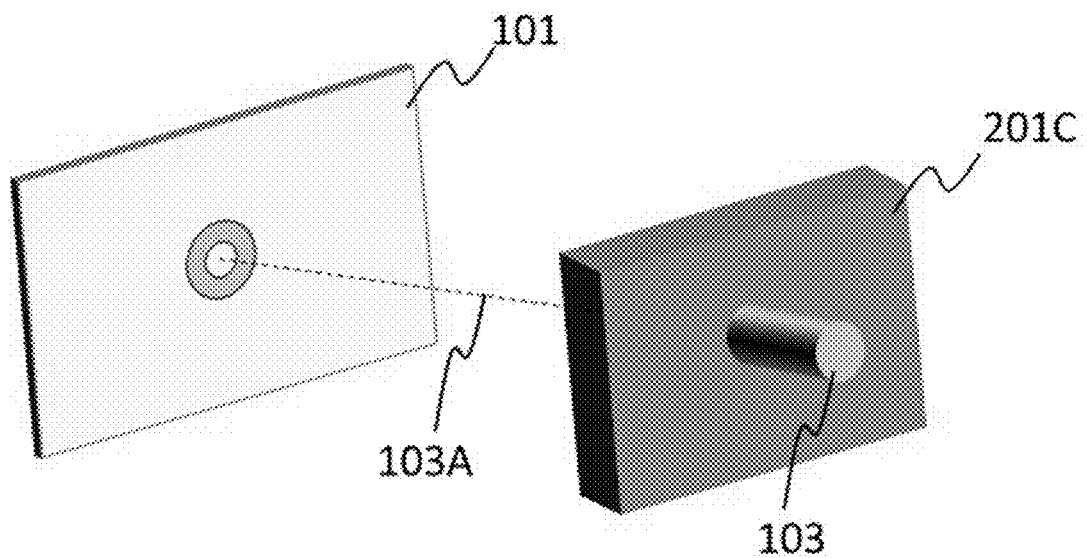
FIG. 2D is an exemplary perspective view illustrating an example when the DOE in FIG. 2C is irradiated with a single laser beam.

FIG. 2D is an exemplary perspective view illustrating an example when the DOE in FIG. 2C is used for single laser beam irradiation.

Figure 2E:
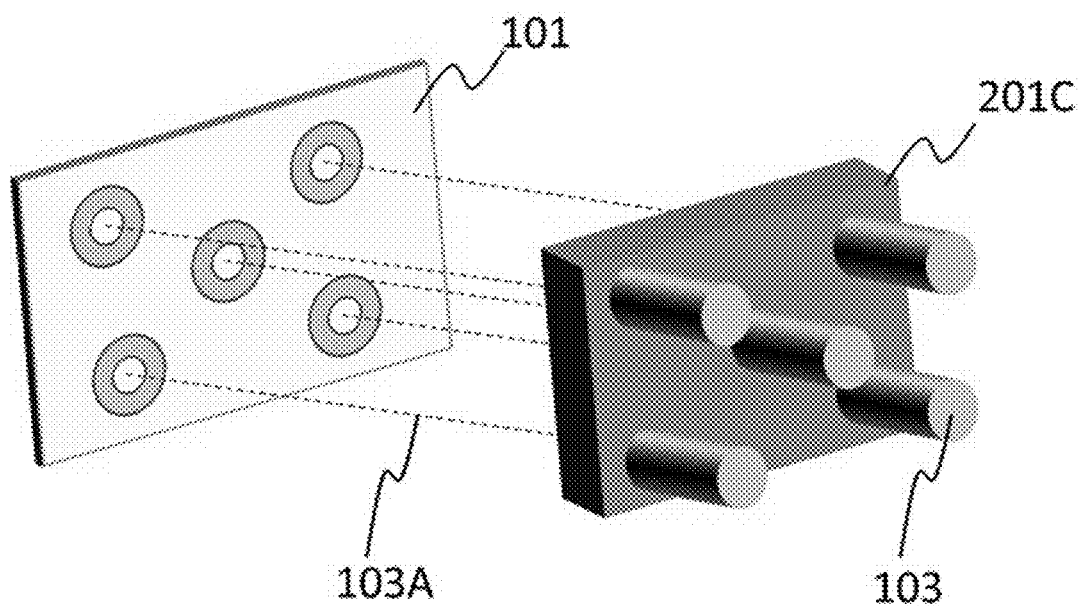
FIG. 2E is an exemplary perspective view illustrating an example when one DOE in FIG. 2D is irradiated with a plurality of laser beams.

FIG. 2E is an exemplary perspective view illustrating an example when one DOE in FIG. 2D is irradiated with a plurality of laser beams.

As illustrated in FIG. 2D and FIG. 2E, using the DOE, it is possible to obtain one annular laser beam by irradiating one DOE with one laser beam, and to also obtain a plurality of annular laser beams by irradiating one DOE with a plurality of laser beams.

In addition, a plurality of axicon lenses having different apex angles and a plurality of DOEs having different phase patterns may be prepared and any of them may be selected depending on the light absorbing material. This makes it possible to irradiate the light absorbing material with a laser beam having an optimum laser intensity for the light absorbing material.

Figure 2F:
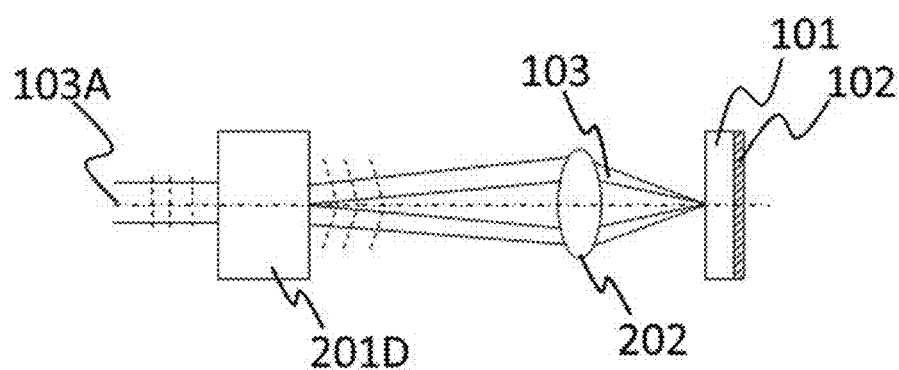
FIG. 2F is an exemplary view illustrating an example when the DOE in FIG. 2C is changed to a liquid crystal phase conversion element (SLM)

FIG. 2F is an exemplary view illustrating an example when the DOE in FIG. 2C is changed to a liquid crystal phase conversion element (SLM) 201D. Time modulation is available with the liquid crystal phase conversion element (SLM). Therefore, it is possible to generate a conical wavefront, a vortex wavefront, or a composite wavefront on which a conical wavefront and a vortex wavefront are superimposed.

Figure 2G:
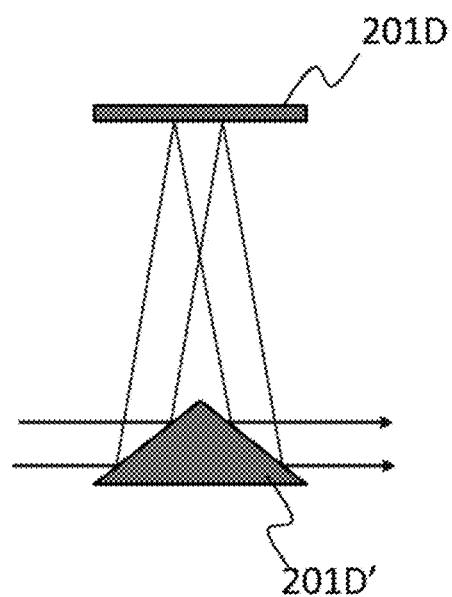
FIG. 2G is an exemplary view illustrating an example when a reflective liquid crystal phase modulating element and a prism mirror are combined as a liquid crystal phase modulating element (SLM)

FIG. 2G is an exemplary view illustrating an example when a reflective liquid crystal phase modulating element 201D and a prism mirror 201D' are combined as the liquid crystal phase conversion element (SLM).

As the laser intensity of the laser beam, it is preferable that the laser intensity of the laser beam on the optical axis of the laser beam be lower than the laser intensity of the laser beam in the outer circumference. It is preferable that no vaporized region be present on the optical axis, and that irradiation with the laser beam on the optical axis have a lower energy than the energy density that causes vaporization.

That is, in the intensity distribution of the laser to be emitted, it is preferable that the maximum intensity of the laser be present apart from the optical axis.

It is preferable that the laser intensity on the optical axis be lower than the laser intensity in the vaporized region but be high enough to raise the temperature of the light absorbing material. Such a laser intensity is preferable because such a laser intensity can apply to the light absorbing material, energy that enables the light absorbing material to depart the interface of the light absorbing material itself and fly, making it easier for the light absorbing material to fly.

A laser that has the maximum laser intensity on the optical axis as in the Gaussian beam of the existing techniques generates a vaporized region on the optical axis and an outward pressure scattering from the optical axis. Therefore, the material is likely to scatter.

The laser intensity of the laser beam used in the present disclosure will be described in detail with reference to the drawings.

FIG. 3A to FIG. 3D are exemplary diagrams illustrating examples of the laser intensity distribution in the present disclosure and examples of a measurement result of an in-plane laser intensity distribution in a direction orthogonal to a laser emitting direction.

Figure 3A:
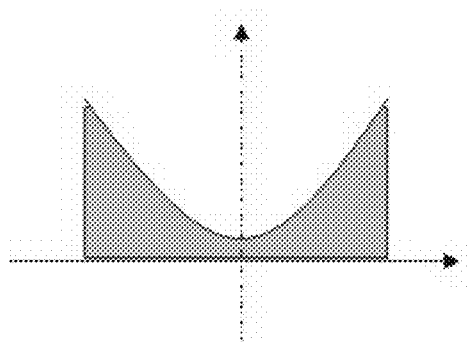
FIG. 3A is an exemplary diagram illustrating an example of a laser intensity distribution in the present disclosure.
Figure 3B:
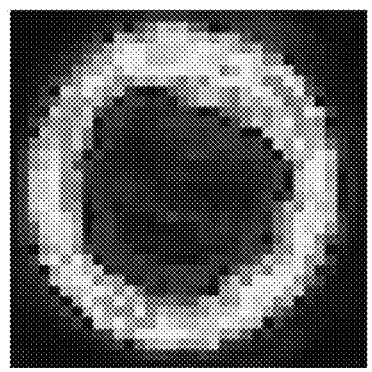
FIG. 3B is a diagram illustrating an example of a measurement result of an in-plane laser intensity distribution in a direction orthogonal to a laser emitting direction in FIG. 3A.

As illustrated in FIG. 3A and FIG. 3B, the laser intensity of the laser beam to be emitted has a distribution in which the intensity is high in the outer circumferential region of the laser beam and the intensity gradually decreases from the outer circumferential region to the optical axis (center).

Figure 3C:
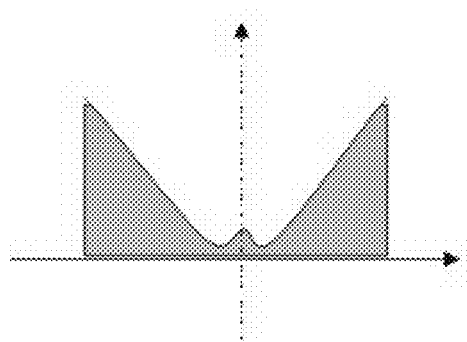
FIG. 3C is an exemplary diagram illustrating another example of a laser intensity distribution in the present disclosure.
Figure 3D:
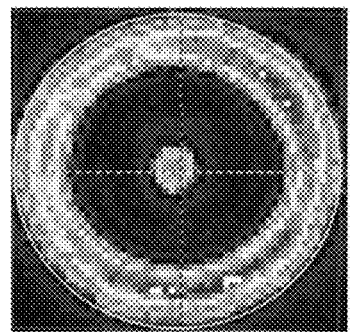
FIG. 3D is a diagram illustrating an example of a measurement result of an in-plane laser intensity distribution in a direction orthogonal to a laser emitting direction in FIG. 3C.

FIG. 3C and FIG. 3D illustrate an intensity distribution in which the laser intensity is high in the outer circumferential region as in FIG. 3A and FIG. 3B, but the laser intensity on the optical axis (center) is higher than the laser intensity of the region close to the optical axis. It is preferable to use the laser beam (annular laser beam) having the laser intensity distribution illustrated in FIG. 3C and FIG. 3D, because the viscosity of the light absorbing material irradiated with such a laser beam lowers on the optical axis (center) and an action to push out the light absorbing material is improved.

The laser transforming unit illustrated in FIG. 2A to FIG. 2G can be used to generate the laser intensity distribution illustrated in FIG. 3C and FIG. 3D.

The liquid crystal phase conversion element (SLM) generally uses only primary light and discards 0-order light. However, when 0-order light is effectively used, a Laguerre-Gaussian beam can have a light intensity even on the optical axis, which is a singular point. These factors may be stored in a database that can perform matrix conversion of these factors, so that optimum factors may be selected.

A preferable laser intensity distribution of an annular laser beam is axisymmetry. Unevenness of the laser intensity distribution is preferably ±20%.

It is preferable that the fluence (J/cm$^2$) of the laser beam at an externally exposed surface of the light absorbing material opposite to a surface contacting the base material be obtained by irradiation with a laser beam having an energy density lower than the energy density that generates the vaporized region. This makes it possible to lower the viscosity of the light absorbing material at the back side (i.e., the externally exposed surface side of the light absorbing material opposite to the surface contacting the bae material), and suppress scattering of a flying body and improve the landing position accuracy.

Fluence typically refers to fluence at the incident side (frontside fluence). In addition, fluence is often discussed in terms of the coefficient of absorption of the material. However, the present inventors' studies have revealed that what matters to the flying quality is the control of fluence at a film surface of the light absorbing material film opposite to a surface irradiated with light (hereinafter, referred to as backside fluence).

This will be described in detail.

When the laser intensity before incidence into the light absorbing material is $I_0$, the light intensity I after incidence is expressed by Formula (3) below using a coefficient of absorption cc, based on the Lambert-Beer Law.

$$I = I_0 \exp(-\alpha t) \quad \text{Formula (3)}$$

where α represents a coefficient of absorption, t represents a film thickness, and $I/I_0$ represents an absorptivity at a film thickness t.

This suggests that the heat input Q varies in the depth direction, and risen temperatures vary. Hence, when the coefficient of absorption and the film thickness are known, it is possible to calculate the fluence at the back side (backside fluence).

Figure 4:
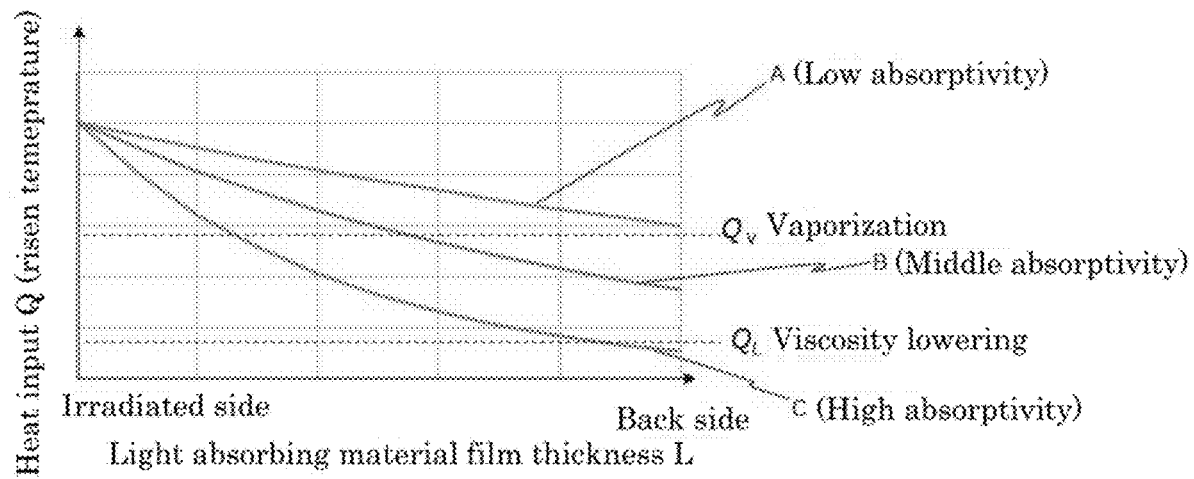
FIG. 4 is a graph plotting an example of risen temperatures in a thin film of a light absorbing material depending on difference in absorptivity.

FIG. 4 is a graph plotting an example of risen temperatures in a thin film of the light absorbing material depending on difference in absorptivity.

$Q_L$ represents energy needed to lower the viscosity, and $Q_V$ represents energy needed for vaporization.

The light absorbing material undergoes viscosity lowering or vaporization depending on the risen temperature.

The material A having a low absorptivity in FIG. 4 becomes a high temperature all over to the back side. Therefore, the back side of the material A becomes a region having a vaporizing pressure. When even the back side of the light absorbing material is the vaporized region, the vaporized region penetrates the film of the light absorbing material to let the light absorbing material scatter. Hence, the material A is overexposed to light. It has been found preferable that the vaporized region be less than or equal to ½ the film thickness of the light absorbing material.

The material C having a high absorptivity in FIG. 4 has almost no heat input to the back side and no temperature rise at the back side. Therefore, the material C maintains the initial high-viscosity state. Such a light absorbing material has been found unable to move easily and fly neatly.

The absorptivity B in FIG. 4 has been found a suitable condition because at the absorptivity B, the frontside fluence reaches the vaporization temperature and the backside fluence reaches the viscosity lowering temperature.

When the material C in FIG. 4 is produced with a small film thickness L, the backside fluence reaches the viscosity lowering temperature. Likewise, it has been found possible to fly the material A in FIG. 4 under suitable conditions by producing the material A with a large film thickness L.

Hence, it has been found possible to fly the light absorbing material with a high quality by the BR method that sets the film thickness of the light absorbing material depending on the absorption property of the light absorbing material and applies to the light absorbing material, energy that enables the light absorbing material to fly by a pressure in the vaporized region higher than or equal to the outside pressure, where the vaporized region is present at the interface between a transparent body and the light absorbing material in a manner that the vaporized region surrounds the optical axis.

The cross-sectional shape and size (inner diameter and outer diameter) of the laser beam are not particularly limited and may be appropriately selected depending on the intended purpose.

Examples of the cross-sectional shape of the laser beam include an annular shape, a polygonal annular shape, and an irregular annular shape.

The inner diameter of the laser beam (or the inner diameter of a beam profile surrounding the optical axis in a wavefront of the light beam) is preferably 20 micrometers or greater but 90 micrometers or less and more preferably 30 micrometers or greater but 70 micrometers or less.

The method for adjusting the size of the laser beam will be described with reference to the drawings.

FIG. 5A is a diagram illustrating an example of exposure intensity distributions when a Laguerre-Gaussian beam index L and a conical wavefront height index H are superimposed.

The Laguerre-Gaussian beam index is an integer. Therefore, when the Laguerre-Gaussian beam index is merely changed, the size of the annular laser beam is discretely changed. Hence, size adjustment is difficult. For example, actually measured values at the Laguerre-Gaussian beam index L=1 are an inner diameter of 20 micrometers and an outer diameter of 70 micrometers. Actually measured values at L=2 are an inner diameter of 30 micrometers and an outer diameter of 80 micrometers. Hence, merely by changing the Laguerre-Gaussian beam index, it is impossible to generate a laser beam having a medium size of the diameters described above (between the inner diameter of 20 micrometers/outer diameter of 70 micrometers and the inner diameter of 30 micrometers/outer diameter of 80 micrometers).

In contrast, the conical wavefront height index H is a real number, and an arbitrary value can be selected as the index H. Hence, it is possible to freely select the inner diameter and the outer diameter.

For example, FIG. 5A illustrates contour maps representing intensity distributions when the conical wavefront height index H is changed among 0, a, b, and c (where a, b, and c are real numbers and satisfy a<b<c) on a Laguerre-Gaussian beam. As illustrated in FIG. 5A, it can been seen that as the conical wavefront height index H is increased, the inner diameter and the outer diameter gradually increase.

For example, when H=c and L=1, the inner diameter is 90 micrometers and the outer diameter is 160 micrometers. When H=c and L=2, the inner diameter is 100 micrometers and the outer diameter is 170 micrometers.

By superimposing the conical wavefront height index H on the laser beam to be emitted, it is possible to arbitrarily adjust the size of the laser beam. By changing L between 1 and 2, it is also possible to change the inner diameter/outer diameter ratio. These operations can select an optimum profile for the light absorbing material.

Examples of the unit configured to superimpose the conical wavefront height index H include a liquid crystal phase conversion element (SLM).

The present inventors have found it possible to control the size of a flying body by the inner diameter of the laser beam to be emitted.

Figure 5B:
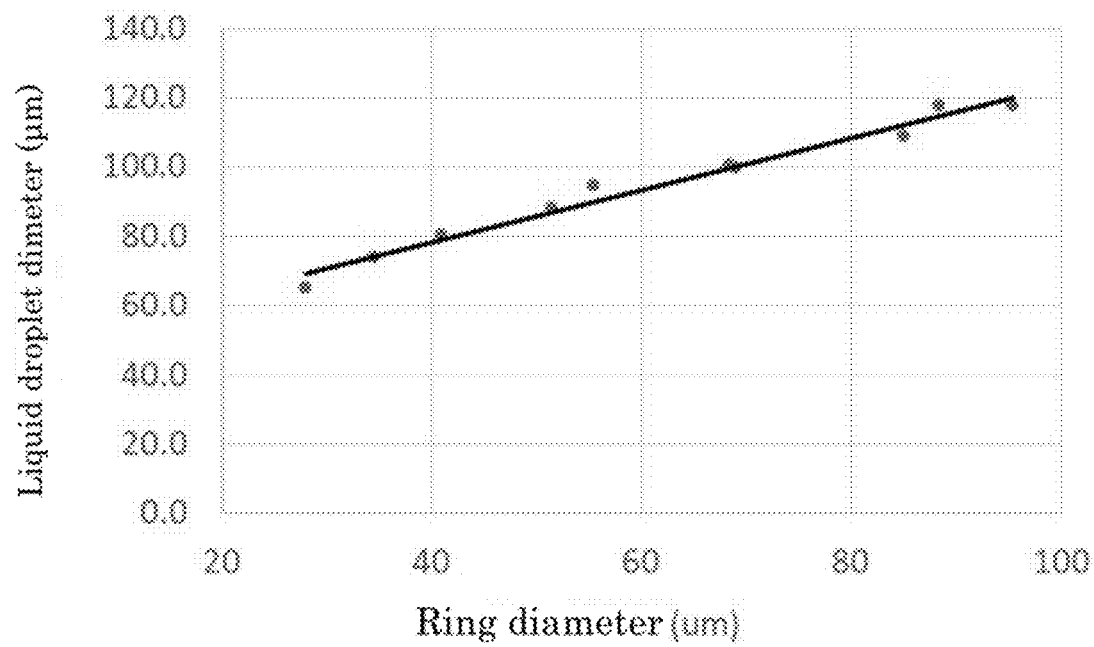
FIG. 5B is a graph plotting an example of a relationship between inner diameter of a laser beam and size (liquid droplet diameter) of a flying body.

FIG. 5B is a graph plotting an example of a relationship between the inner diameter of a laser beam and the size (liquid droplet diameter) of a flying body. It can be seen that as the inner diameter of the laser beam is increased, the size (liquid droplet diameter) of a flying body increases. That is, in the present disclosure, it has been found possible to control the size of a flying body by the inner diameter of the laser beam to be emitted.

In other words, it can be seen that as the ring diameter is increased, the liquid droplet diameter linearly increases. When the ring diameter is defined, the liquid droplet diameter is defined uniquely under the same donor conditions. In other words, this suggests that it is possible to control the liquid droplet diameter by changing the ring diameter. The liquid droplet size is an important parameter that is directly related with print qualities. LIFT systems that use a Gaussian beam has difficulty controlling the liquid droplet diameter because the liquid droplet diameter is dependent on the pulse energy. On the other hand, the BR-LIFT method can control the liquid droplet diameter by changing the ring diameter, and can realize high-definition printing by a small-diameter ring and high-speed printing by a large-diameter ring. Therefore, the BR-LIFT method can improve the control capability of the system.

Figure 5C:
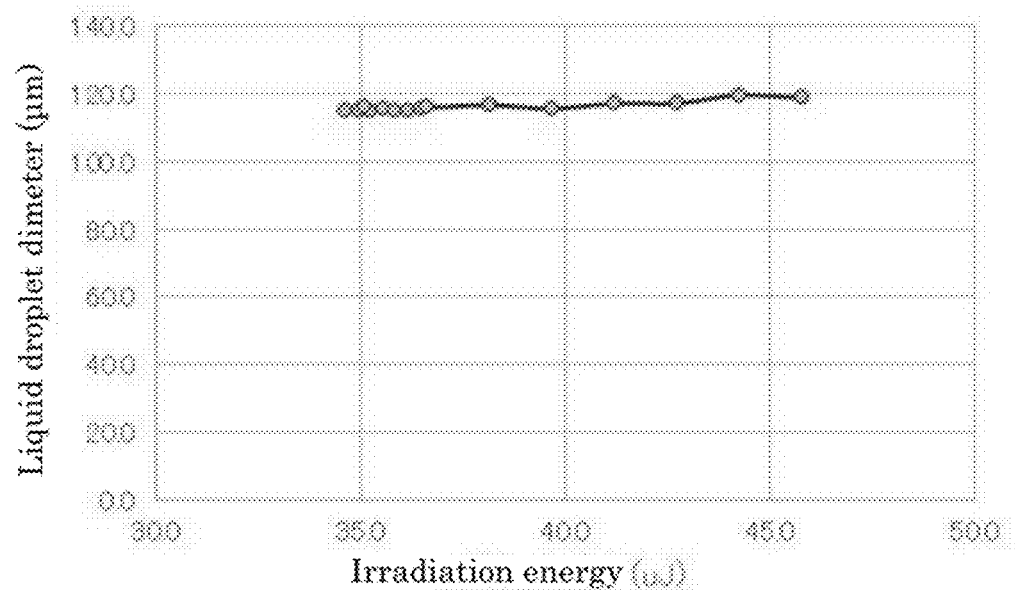
FIG. 5C is a graph plotting an example of a relationship between irradiation energy and size (liquid droplet diameter) of a flying body.

FIG. 5C plots a relationship between the irradiation (pulse) energy and the size (liquid droplet diameter) of a flying body.

FIG. 5C plots the results obtained when a magenta ink having a viscosity of 4 Pa·s and a film thickness of 20 micrometers is flown at a gap of 500 micrometers. The horizontal axis represents the irradiation energy, and the vertical axis represents the liquid droplet diameter. The results reveal that the liquid droplet diameter is constant irrespective of the irradiation energy.

The pulse energy increased from 34.6 microjoules to 45.8 microjoules, whereas the liquid droplet diameter increased only by 3.4%. These results suggest that the liquid droplet diameter is constant irrespective of the irradiation energy. The LIFT method generally incurs liquid droplet size increase as the irradiation energy is increased (for example, see L. Rapp, J. Ailuno, A. P. Alloncle and P. Delaporte, "Pulsed-laser printing of silver nanoparticles ink: control of morphological properties," Opt. Express 19 (2011) 21563-74). BR-LIFT has been found able to realize stable printing because the liquid droplet diameter is not dependent on the irradiation energy.

The existing LIFT method generally incurs liquid droplet diameter increase as the irradiation energy is increased. The BR method of the present disclosure has been found able to stably generate a flying body because the liquid droplet diameter is not dependent on the irradiation energy.

Hence, the existing method incurs change of the liquid droplet diameter that directly links to the printing quality, depending on the laser irradiation energy, whereas the BR method of the present disclosure has been found able to control the size (liquid droplet diameter) of a flying body within a certain range (or to realize stable printing in, for example, image formation), by not relying on the irradiation energy but by controlling the inner diameter of the laser beam.

—Laser Beam Shaping Unit—

Examples of the laser beam shaping unit include a laser beam magnification variation unit and a phase distribution converting unit.

The laser beam shaping unit is disposed at the light source side of a condenser lens, and an incident laser beam can form a desired cross-sectional shape and a desired transmission wavefront by the front surface of the condenser lens.

—Laser Beam Magnification Variation Unit—

The laser beam magnification variation unit is a unit configured to change the ratio between one beam diameter of an incident laser beam and another beam diameter of the incident laser beam orthogonal to the one beam diameter in a cross-section of the incident laser beam orthogonal to the optical axis of the incident laser beam.

Examples of the laser beam magnification variation unit include a prism.

Figure 6A:
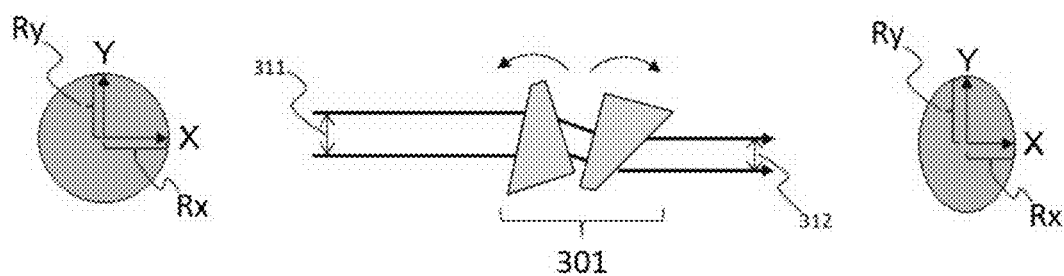
FIG. 6A is a view illustrating an example of a laser beam magnification variation unit.
Figure 6B:
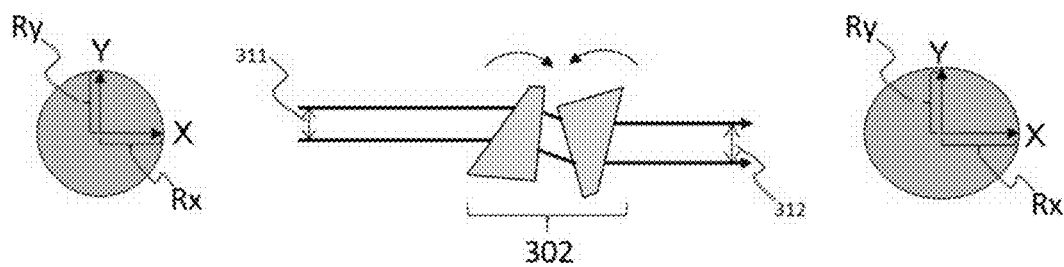
FIG. 6B is a diagram illustrating another example of a laser beam magnification variation unit.

FIG. 6A and FIG. 6B illustrate examples of the laser beam magnification variation unit. The laser beam magnification variation unit illustrated in FIG. 6A includes a pair of transparent prisms (double prisms 301) such as glass, and is configured to change the direction of light utilizing light refraction to change the magnification of the light only in one direction. Magnification variation means magnification change in a manner to change the aspect ratio of a laser beam cross-section. In FIG. 6A, the left circle represents the cross-sectional shape of an incident laser beam. For facilitation of understanding, the incident laser beam is assumed to be circular. When the radius of the cross-sectional shape of the incident laser beam in the x direction is Rx and the radius of the cross-sectional shape of the incident laser beam in the y direction is Ry, Rx/Ry=1 is satisfied (in FIG. 6A, the diameter $D_{in}$ of the incident laser bean is denoted by 311 and the diameter $D_{out}$ of the outgoing laser beam is denoted by 312).

FIG. 6A illustrates an example in which the incident-side prism is rotated counterclockwise and the outgoing-side prism is rotated clockwise. In this case, the outgoing laser beam becomes relatively smaller than the incident laser beam in the x direction. That is, magnification reduction to Rx/Ry<1 is available.

FIG. 6B illustrates an example in which the incident-side prism is rotated clockwise and the outgoing-side prism is rotated counterclockwise. In this case, the outgoing laser beam becomes relatively larger than the incident laser beam in the x direction. That is, magnification expansion to Rx/Ry>1 is available.

As described above, it is possible to freely change the ratio Rx/Ry of one beam diameter of an incident laser beam to another beam diameter of the incident laser beam beam orthogonal to the one beam diameter in a cross-section of the incident laser beam orthogonal to the optical axis of the incident laser beam.

—Phase Distribution (Wavefront) Converting Unit—

The phase distribution converting unit is a unit configured to convert the phase distribution of an incident laser beam wavefront.

Examples of the phase distribution converting unit include a convex cylinder lens.

Figure 7A:
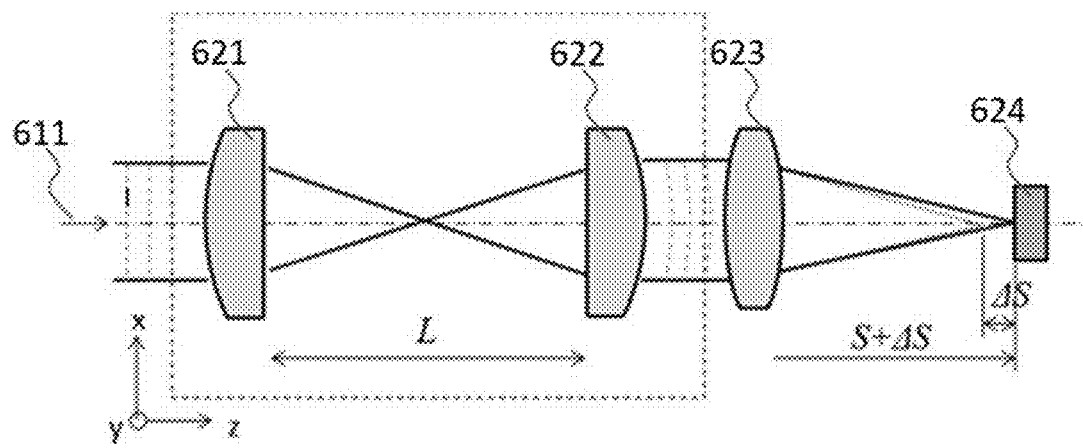
FIG. 7A is a view illustrating an example of a phase distribution converting unit.
Figure 7B:
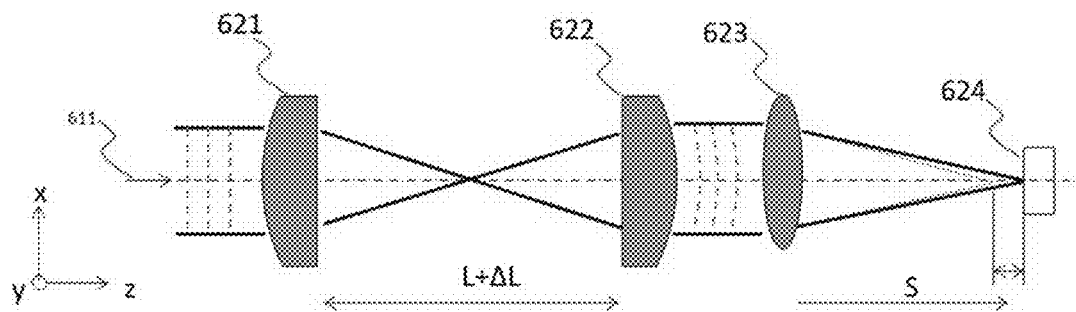
FIG. 7B is a view illustrating an example of a phase distribution converting nit.

FIG. 7A and FIG. 7B illustrate examples of the phase distribution converting unit. In FIG. 7A and FIG. 7B, the reference numeral 611 denotes an optical axis, the the reference numeral 621 denotes a first lens, the the reference numeral 622 denotes a second lens, the the reference numeral 623 denotes a condenser lens, the the reference numeral 624 denotes a surface irradiated with a laser beam, the reference sign L denotes the distance between the first lens and the second lens, the reference sign ΔL denotes the travel distance of the first lens to the second lens or vice versa, the reference sign S denotes the distance between the condenser lens and the irradiated surface, and the reference sign ΔS denotes the travel distance of the condenser lens to the irradiated surface or vice versa.

FIG. 7A illustrates a wavefront converting device using double cylindrical lenses. In this device, both of a first lens 621 and a second lens 622 are convex cylindrical lenses. A cylindrical lens has different focal points in the X axis direction and in the Y axis direction. The distance between the principal point of the first lens 621 and the principal point of the second lens 622 is referred to as a distance d. When the distance d is equal to double the focal length f (=2fx) of the lens, the focal point in the x axis and the focal point in the y axis coincide with each other. When the distance d is greater than 2fx, the focal point in the x axis shifts toward the laser. On the other hand, when the distance d is less than 2fx, the focal point in the x axis shifts toward the workpiece. The focal point in the y axis is fixed under arbitrary conditions. Hence, this device can shift the focal point only in the x axis.

Astigmatism correction effects can be confirmed with a wavefront sensor. Hence, by employing the cylindrical lens method, it is possible to remove all Zernike polynomials that are n≤2. Astigmatism is one of the most important factors that need to be removed from BR-LIFT.

The phase distribution converting unit illustrated in FIG. 7B is an optical system configured to correct a transmission wavefront using two convex cylinder lens optical systems. When two cylinder lenses are disposed counter to each other in a manner that the focal points of the two cylinder lenses coincide with each other, a wavefront remains flat at a magnification of xl and is condensed at the same position in the x direction and in the y direction. When the gap between the cylinder lenses is slightly changed, it is possible to form a cylinder wavefront independent in the x direction. When these optical systems are combined with the defocusing effect of the condenser lens 623, it is possible to generate a 0-degree astigma component of a transmission wavefront.

More specifically, the laser beam shaping unit may have the following configuration.

First lens (CYL1): a flat convex cylinder lens having a focal length of 50 mm, glass material: synthetic quartz Second lens (CYL2): a flat convex cylinder lens having a focal length of 50 mm, glass material: synthetic quartz Third lens: a condenser lens (axisymmetric lens) having a focal length of 100 mm, glass material: synthetic quartz The focal length S is the distance between a first surface of a condenser lens and a light condensed point. There is a relationship that the focal point S becomes farther by 0.5 mm when the gap L between CYLs (cylinder lenses 621 and 622) is reduced by 100 micrometers. This makes it possible to set the focal points in the x and y directions independently. In the specific example described above, two convex cylinder lenses are used for one cylinder. However, a lens obtained by pasting, for example, achromat lenses together may be used.

Moreover, a lens having an aspherical shape can realize a greater aberration correction.

Any other basic properties are the same as concavo-convex CYL optical systems. Although having a longer optical path than concavo-convex CYL optical systems, the present system can generate a very good wavefront.

Using a plurality of lenses and a liquid crystal phase modulating element, it is possible to convert the phase distribution of an incident laser beam wavefront to an ideal condition.

The cylinder lens method has limitations on the phase distribution conversion patterns, but can correct astigmatism, which cannot be overcome by alignment of optical components, favorably with a high quality.

In the way described above, it is possible to improve the flying accuracy.

—Other Units—

The other units are not particularly limited and may be appropriately selected depending on the intended purpose. Examples of the other units include a beam wavelength changing element and an output power adjusting unit.

—Beam Wavelength Changing Element—

The beam wavelength changing element is not particularly limited and may be appropriately selected depending on the intended purpose so long as the beam wavelength changing element can change the wavelength of a laser beam to a wavelength that can be absorbed by the light absorbing material and can be transmitted through a base material described below. Examples of the beam wavelength changing element include a KTP crystal, a BBO crystal, an LBO crystal, and a CLBO crystal.

—Output Power Adjusting Unit—

The output power adjusting unit is not particularly limited and may be appropriately selected depending on the intended purpose so long as the output power adjusting unit can adjust a laser beam to an appropriate output power. Examples of the output power adjusting unit include glass.

The output power of a laser beam with which the light absorbing material is irradiated is not particularly limited and may be appropriately selected depending on the intended purpose so long as the vaporized region of the present disclosure can be generated. In the following description, "output power" may be referred to as "irradiation energy".

It is preferable to appropriately adjust the irradiation energy of a laser beam because the appropriate value of the irradiation energy is different depending on the viscosity and film thickness of the light absorbing material. Specifically, the irradiation energy of a laser beam is preferably 100 microjoules/dot or lower and more preferably 60 microjoules/dot or lower. The irradiation energy of an optical vortex laser beam of 60 microjoules/dot or lower is advantageous because it is easier to realize a condition that can generate a liquid column that converges to a diameter smaller than the irradiation diameter of the laser while rotating about the center axis of the irradiation diameter extending in the emitting direction, or a condition that can generate a liquid droplet, which is a partially separated body of such a liquid column.

—Base Material—

For example, the shape, structure, size, and material of the base material are not particularly limited and may be appropriately selected depending on the intended purpose. The shape of the base material is not particularly limited and may be appropriately selected depending on the intended purpose so long as the base material can bear the light absorbing material over a surface and can be irradiated with a laser beam at the back surface. Examples of the shape of the base material include a flat plate shape, a true-circular or elliptic tubular shape, a surface partially cut out from a tubular shape, and an endless belt type shape. It is preferable that the base material have a tubular shape and a light absorbing material feeding unit feed the light absorbing material to the surface of the base material that is rotating in the circumferential direction. Bearing the light absorbing material over the surface of the base material having a tubular shape allows feeding the light absorbing material irrespective of a dimension of the attaching target in the outer circumferential direction of the tubular shape. In this case, by providing the light absorbing material flying unit inside the tubular shape in a manner that an optical vortex laser beam can be emitted from inside the tubular shape to the outer circumference of the tubular shape, and by rotating the base material in the circumferential direction, it is possible to realize continuous irradiation. Examples of the flat plate shape of the base material include a slide glass.

The structure of the base material is not particularly limited and may be appropriately selected depending on the intended purpose.

The size of the base material is not particularly limited and may be appropriately selected depending on the intended purpose. It is preferable that the base material have a dimension matching the width of the attaching target.

The constituent material of the base material is not particularly limited and may be appropriately selected depending on the intended purpose so long as light can be transmitted through the base material. Among materials through which light can be transmitted, inorganic material such as various kinds of glass containing silicon oxide as a main component, and organic materials such as transparent heat-resistant plastics and elastomers are preferable in terms of transmittance and heat resistance. The base material may be referred to as a transparent body.

The surface roughness Ra of the base material is not particularly limited and may be appropriately selected depending on the intended purpose. The surface roughness Ra of the base material is preferably 1 micrometer or less on both of the external and internal surfaces in terms of suppressing refractive scatter of a laser beam and preventing reduction of energy to be applied to the light absorbing material. When the surface roughness Ra of the base material is within a preferable range, it is possible to suppress variation of the average thickness of the light absorbing material attached on the attaching target, and attach the light absorbing material in a desired amount.

The surface roughness Ra can be measured according to JIS B0601. For example, the surface roughness Ra can be measured with a confocal laser microscope (available from Keyence Corporation) and a contact-type surface profile measuring instrument (DEKTAK150, available from Bruker AXS K.K.).

—Light Absorbing Material—

The light absorbing material contains a light absorbing substance and contains other substances that are appropriately selected as needed.

The absorbance of the light absorbing material to the wavelength of light (laser beam) is preferably higher than 1 and more preferably higher than 2. It is preferable that the absorbance of the light absorbing material to the wavelength of a laser beam be higher than 2, because energy efficiency can be enhanced.

—Light Absorbing Substance—

The light absorbing substance is not particularly limited and may be appropriately selected depending on the intended purpose so long as the light absorbing substance absorbs light having a predetermined wavelength. Examples of the light absorbing substance include colorants such as pigments and dyes.

The light transmittance (absorbance) of a coating film formed of the light absorbing material having a light absorbing property is preferably 10% or lower (1 or higher), more preferably 1% or lower (2 or higher), yet more preferably 0.1% or lower (3 or higher), and particularly preferably 0.01% or lower (4 or higher). When the transmittance is within the preferable range, there are advantages that the energy of an optical vortex laser beam absorbed into the base material is not likely to be converted to heat, so the light absorbing material is not likely to be exposed to changes such as drying and melting. Furthermore, when the transmittance is within the preferable range, there is an advantage that energy applied to the light absorbing material is less likely to lower, so the light absorbing material is not likely to be attached on a wrong position.

The transmittance (absorbance) can be measured with, for example, a spectrophotometer (available from Shimadzu Corporation, UV3600).

For example, the form, size, and material of the light absorbing material are not particularly limited and may be appropriately selected depending on the intended purpose.

Examples of the form of the light absorbing material include a liquid, a solid, and a powder.

Particularly, success in flying a high-viscosity material or a solid is an advantage that cannot be achieved by existing inkjet recording methods.

When the light absorbing material is a solid or a powder, it is preferable that the light absorbing material have a viscous property when irradiating the light absorbing material with an optical laser beam. Specifically, when flying a solid or a powder, for example, it is preferable to heat the light absorbing material to a melted state having a viscous property, before irradiating the light absorbing material with an optical vortex laser beam.

The light absorbing material that is a liquid is not particularly limited and may be appropriately selected depending on the intended purpose. Examples of the light absorbing material that is a liquid include an ink containing a pigment and a solvent, and a conductive paste containing a conductor and a solvent. When an ink containing a solvent is irradiated with a laser beam and the solvent does not absorb light, energy of the optical vortex laser beam is applied to a light-absorbable material contained in the ink other than the solvent and the solvent flies together with the material.

The viscosity of the light absorbing material that is a liquid is not particularly limited, may be appropriately selected depending on the intended purpose, and is preferably 50,000 mPa·s or lower, and more preferably 5,000 mPa·s or lower. When the viscosity of the light absorbing material is extremely high, surface tension effects are not obtained easily. Considering these factors, a UV-curable ink is preferable.

The viscosity can be measured with, for example, a rotary viscometer (available from Toki Sangyo Co., Ltd., VISCO-MATE VM-150III) or a rheometer (HAAKE RHEO-STRESS 600, available from Thermo Fisher Scientific K.K.) in an environment at 25 degrees C.

It is preferable that the light absorbing material be a material of which viscosity lowers when irradiated with a laser beam.

Figure 8:
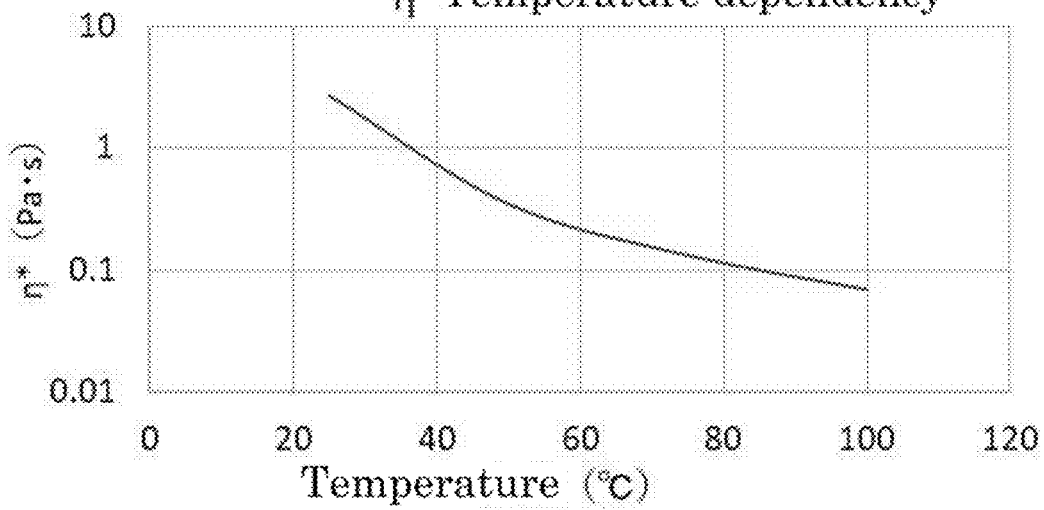
FIG. 8 is a graph plotting an example of a relationship between temperature and viscosity of a light absorbing material.

FIG. 8 plots a relationship between the temperature and the viscosity $\eta^*$ of the light absorbing material (specific example: magenta ink). For example, when the temperature is raised from room temperature of 25 degrees C. by 25 degrees C., it is possible to lower the viscosity of the light absorbing material to $\frac{1}{5}$ or lower.

From this fact, it is seen that when the viscosity $\eta^*$ of a region (inside) heated by irradiation with a laser beam becomes lower than the viscosity outside the region heated by irradiation with the laser beam at the interface between the base material and the light absorbing material, it is possible to make the pressure of a compressed gas in the generated vaporized region act in the inward direction. This makes it possible to apply a pressure in a manner to enclose the light absorbing material as illustrated in FIG. 1 and fly the light absorbing material in the form of a liquid droplet that does not scatter.

The relationship between the viscosity $\eta$ of the light absorbing material and the energy of a laser beam can be obtained from Andrade's formula expressed by Formula (2) below.

$$\eta = B\exp\left(\frac{E}{RT}\right) \qquad \text{Formula (2)}$$

In Formula (2), $\eta$ represents viscosity, E represents activating energy, T represents absolute temperature, R represents gas constant, and B represents constant of proportionality.

By using a material that appropriately conforms to the Andrade's formula and applying energy that does not bring the light absorbing material to vaporization, it is possible to lower the viscosity of the light absorbing material. This makes it possible to induce the vaporizing pressure toward the optical axis.

The conductive paste is not particularly limited and may be appropriately selected depending on the intended purpose so long as the conductive paste is an ink containing a conductor. Examples of the conductive paste include a conductive paste known or commonly used in the method for fabricating circuit boards.

The conductor is not particularly limited and may be appropriately selected depending on the intended purpose. Examples of the conductor include conductive inorganic particles such as silver, gold, copper, nickel, ITO, carbon, and carbon nanotube, and particles formed of conductive organic polymers such as polyaniline, polythiophene (e.g., poly(ethylenedioxythiophene)), polyacetylene, and polypyrrole. One of these conductors may be used alone or two or more of these conductors may be used in combination.

The volume resistivity of the conductive paste is not particularly limited, may be appropriately selected depending on the intended purpose, and is preferably $10^3$ Ω·cm or lower because the conductive paste can be used for typical applications as electrodes.

Examples of the light absorbing material that is a powder include a toner containing a pigment and a binder resin, and metal particles such as solder balls.

In this case, in response to irradiation with a laser beam, energy of the laser beam is applied to the pigment, and the binder resin flies together with the pigment as a toner. The light absorbing material that is a powder may contain only a pigment.

The light absorbing material that is a solid is not particularly limited and may be appropriately selected depending on the intended purpose. Examples of the light absorbing material that is a solid include metal thin films formed by sputtering or vapor deposition, and compacts of powders such as dispersions.

The metal thin film is not particularly limited and may be appropriately selected depending on the intended purpose. Examples of metals include common metals such as silver, gold, aluminum, platinum, and copper that can be vapor-deposited or sputtered. One of these metals may be used alone or two or more of these metals may be used in combination.

Examples of the method for flying the metal thin film and forming an image pattern include a method of previously forming a metal thin film over a base material such as glass and a film and irradiating the metal thin film with an optical vortex laser beam to fly the metal thin film and form an image pattern. Other examples of the method include a method of flying a non-image portion to form an image pattern.

Preferable examples of the compact of a powder include a film (layer) having a predetermined average thickness. A film (layer)-shaped solid may be borne over a surface of a base material.

The size of the light absorbing material is not particularly limited and may be appropriately selected depending on the intended purpose.

The average thickness (film thickness) of the light absorbing material is not particularly limited, may be appropriately selected depending on the intended purpose, and is preferably 3 micrometers or greater, more preferably 5 micrometers or greater, and yet more preferably 5 micrometers or greater but 35 micrometers or less. When the average thickness of the light absorbing material is within the preferable range, it is possible to suppress scattering of the light absorbing material when the light absorbing material is irradiated with a laser beam.

The volume and size of a flying body to be generated can be controlled based on the average thickness of the light absorbing material.

This will be further described with reference to the drawings. FIG. 9A to FIG. 9D are diagrams illustrating the results of studying a flying body generated using a flying body generating apparatus illustrated in FIG. 12A described below and the average thickness of the light absorbing material.

For generating a flying body, a nanosecond laser having a wavelength of 532 nm and a condenser lens having a focal length of 100 mm are used. A galvano scanner is used as a scanning optical system. One-shot exposure to light is performed at a scanning speed of 100 mm/s at intervals of 200 micrometers.

A magenta ink is used as the light absorbing material. As the properties, the magenta ink has a viscosity of 4 Pa·s, a density of 1,174 kg/m$^3$, a specific heat of 1,680 J/(kg·K), Tb of 200 degrees C., and a transmittance of 0.85 at a thickness of 1 micrometer.

Figure 9A:
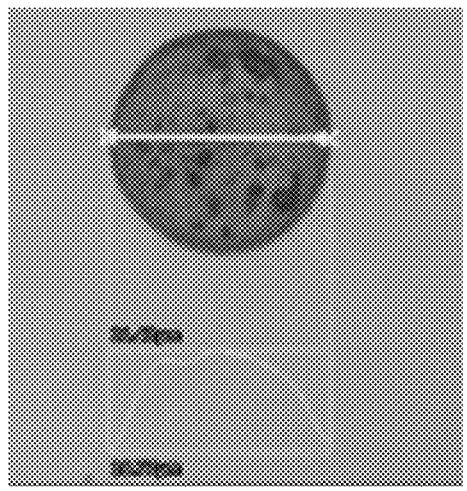
FIG. 9A is a diagram illustrating an example of a relationship between volume of a flying body and average thickness of a light absorbing material.
Figure 9B:
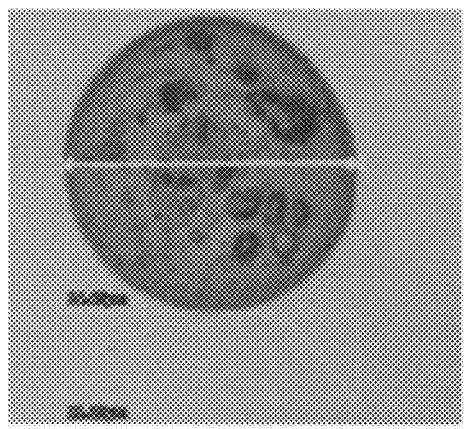
FIG. 9B is a diagram illustrating another example of a relationship between volume of a flying body and average thickness of a light absorbing material.
Figure 9C:
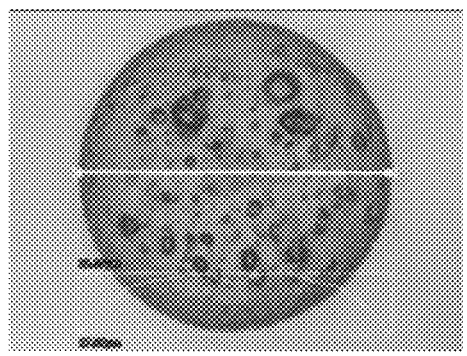
FIG. 9C is a diagram illustrating an example of a relationship between volume of a flying body and average thickness of a light absorbing material.
Figure 9D:
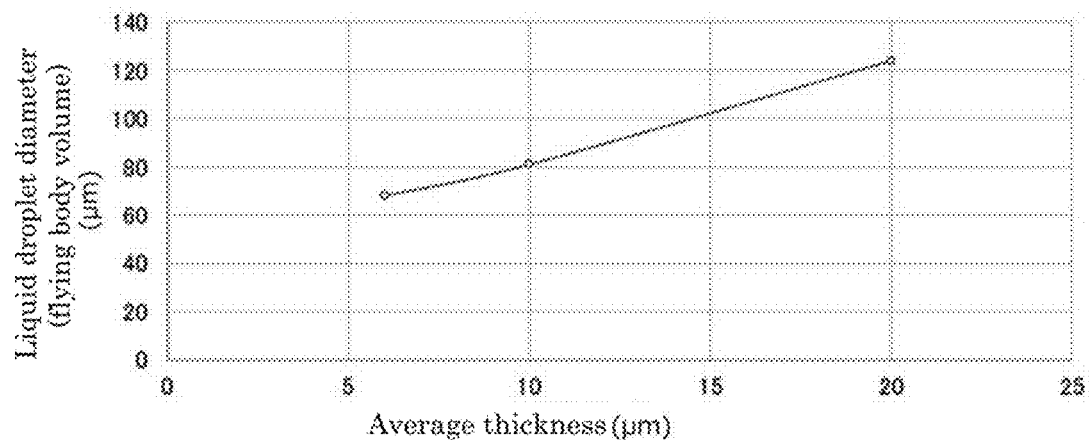
FIG. 9D is a graph plotting an example of a relationship between volume of a flying body and average thickness of a light absorbing material.

FIG. 9D plots the measured size of a liquid droplet obtained from a flying body when the thickness of the light absorbing material is 6 micrometers, 10 micrometers, and 20 micrometers. An optimum condition in the internal diameter range of from 20 micrometers through 90 micrometers is used as the beam profile.

FIG. 9A to FIG. 9D illustrate the results of attachment on the attaching target at a gap of 500 micrometers. FIG. 9A to FIG. 9D illustrate actual liquid droplets observed under the conditions described above. Liquid droplets having shapes close to true circles are observed.

As illustrated in FIG. 9A, the liquid droplet observed is a result obtained by irradiating the light absorbing material having an average thickness of 20 micrometres with 32 microjoules, and has a liquid droplet diameter of 124 micrometers, a liquid droplet amount of 30 pl, and an average (spherical) diameter of 39 micrometers.

As illustrated in FIG. 9B, the liquid droplet observed is a result obtained by irradiating the light absorbing material having an average thickness of 10 micrometers with 18 microjoules, and has a liquid droplet diameter of 81 micrometers, a liquid droplet amount of 8 pl, and an average (spherical) diameter of 25 micrometers.

As illustrated in FIG. 9C, the liquid droplet observed is a result obtained by irradiating the light absorbing material having an average thickness of 6 micrometers with 12 microjoules, and has a liquid droplet diameter of 68 micrometers, a liquid droplet amount of 5 pl, and an average (spherical) diameter of 21 micrometers.

FIG. 9D plots the relationship between the average thickness and the liquid droplet diameter. It has turned out that the liquid droplet diameter (dot diameter) when the liquid droplet flies with a good quality has a linear relationship with the film thickness.

In order to form a small-diameter dot, it is found appropriate to make the light absorbing material thin and reduce the energy correspondingly to the thickness of the thin film Hence, it is found possible to form an image having a desired resolution by controlling the average thickness of the light absorbing material.

With a thin film thinner than 6 micrometers or a thick film greater than or equal to 20 micrometers, it is difficult to fly the light absorbing material in a suitable manner even when the fluence is changed. The reason is inferred to be that there is no condition that satisfies both of the frontside fluence and the backside fluence.

When the average thickness of the light absorbing material is within the preferable range when the light absorbing material is fed in the form of a film (layer), it is possible to secure the strength of the film (layer) of the light absorbing material even through continuous flying of the light absorbing material. This is advantageous because it is possible to feed the light absorbing material stably. Moreover, because the energy of the laser beam needs not be extremely high, there is an advantage that the light absorbing material is not likely to deteriorate or decompose particularly when the light absorbing material is an organic substance.

Depending on the coating method, it is possible to feed the light absorbing material in the form of a film (layer) retaining a predetermined pattern.

The method for measuring the average thickness is not particularly limited and may be appropriately selected depending on the intended purpose. Examples of the method include a method of selecting a plurality of arbitrary points of the light absorbing material and calculating the average of the thicknesses of the plurality of points. The average of thickness of five points is preferable, the average of thicknesses of ten points is more preferable, and the average of thicknesses of twenty points is particularly preferable.

The instrument for measuring the average thickness is not particularly limited and may be appropriately selected depending on the intended purpose. Examples of the instrument include contactless or contact-type instruments such as a laser displacement sensor and a micrometer.

The constituent material of the light absorbing material is not particularly limited and may be appropriately selected depending on the intended purpose. For example, the constituent material may be a colorant such as a toner for image formation, or may be a three-dimensional object forming agent described below for production of a three-dimensional object.

—Colorant—

For example, the shape and constituent material of the colorant are not particularly limited and may be appropriately selected depending on the intended purpose like the light absorbing material. Differences between the light absorbing material and the light absorbing material when it is a colorant will be described below.

The colorant that is a liquid is not particularly limited and may be appropriately selected depending on the intended purpose. For example, a water-based ink obtained by dispersing a colorant such as a dye, a pigment, colorant particles, and colorant oil droplets in water serving as a solvent may be used. Not only a water-based ink, but also a colorant containing as a solvent, a liquid having a relatively low boiling point such as hydrocarbon-based organic solvents and various alcohols may be used. Among these colorants, a water-based ink is preferable in terms of safety of a volatile component and a risk of explosion.

An image forming apparatus using the flying body generating apparatus of the present disclosure can form images using, for example, process inks for offset printing using a plate, inks compliant with JAPAN COLOR, and spot color inks. Therefore, the image forming apparatus using the flying body generating apparatus of the present disclosure can easily reproduce without a plate, digital images matching the colors used in offset printing.

Moreover, the image forming apparatus using the flying body generating apparatus of the present disclosure can form images using UV-curable inks. Therefore, the image forming apparatus using the flying body generating apparatus of the present disclosure can prevent blocking of overlaid recording media sticking to each other and simplify a drying step by curing the UV-curable inks by irradiation with ultraviolet rays in a fixing step.

Examples of the constituent material of the colorant include organic pigments, inorganic pigments, and dyes. One of these materials may be used alone or two or more of these materials may be used in combination.

Examples of the organic pigments include dioxazine violet, quinacridone violet, copper phthalocyanine blue, phthalocyanine green, sap green, monoazo yellow, disazo yellow, polyazo yellow, benzimidazolone yellow, isoindolinone yellow, fast yellow, cromophtal yellow, nickel azo yellow, azomethine yellow, benzimidazolone orange, alizarin red, quinacridone red, naphthol red, monoazo red, polyazo red, perylene red, anthraquinonyl red, diketo-pyrrolo-pyrrole red, diketo-pyrrolo-pyrrole orange, benzimidazolone brown, sepia, and aniline black. Examples of metal lake pigments among organic pigments include rhodamine lake, quinoline yellow lake, and brilliant blue lake.

Examples of inorganic pigments include cobalt blue, cerulean blue, cobalt violet, cobalt green, zinc white, titanium white, titanium yellow, chromium titanium yellow, light red, chromium oxide green, mars black, viridian, yellow ocher, alumina white, cadmium yellow, cadmium red, vermilion, lithopone, ultramarine, talc, white carbon, clay, mineral violet, rose cobalt violet, silver white, calcium carbonate, magnesium carbonate, zinc oxide, zinc sulfide, strontium sulfide, strontium aluminate, brass, gold dust, bronze powder, aluminum powder, brass pigment, ivory black, peach black, lamp black, carbon black, Prussian blue, aureolin, titanium mica, yellow ocher, terre verte, raw sienna, raw umber, cassel earth, chalk, plaster, burnt sienna, burnt umber, lapis lazuli, azurite, malachite, orpiment, cinnabar, coral powder, Gofun, red iron oxide, navy blue, deep blue, argentine, and iron oxide-treated pearl.

Among these colorants, carbon black is preferable as a black pigment in terms of hue and image storage stability.

C.I. pigment blue 15:3, which is copper phthalocyanine blue, is preferable as a cyan pigment in terms of hue and image storage stability.

C.I. pigment red 122, which is quinacridone red, C.I. pigment red 269, which is naphthol red, and C.I. pigment red 81:4, which is rhodamine lake, are preferable as magenta pigments. One of these magenta pigments may be used alone or two or more of these magenta pigments may be used in combination. Among these magenta pigments, a mixture of C.I. pigment red 122 and C.I. pigment red 269 is more preferable in terms of hue and image storage stability. As the mixture of C.I. pigment red 122 (P.R.122) and C.I. pigment red 269 (P.R.269), a mixture in which P.R.122:PR.269 is 5:95 or greater but 8020 or less is particularly preferable. When P.R.122:PR.269 is in the particularly preferable range, the hue does not fall out of magenta colors.

C.I. pigment yellow 74, which is monoazo yellow, C.I. pigment yellow 155, which is disazo yellow, C.I. pigment yellow 180, which is benzimidazolone yellow, and C.I. pigment yellow 185, which is isoindolinone yellow, are preferable as yellow pigments. Among these yellow pigments, C.I. pigment yellow 185 is more preferable in terms of hue and image storage stability. One of these yellow pigments may be used alone or two or more of these yellow pigments may be used in combination.

When using the light absorbing material as a process color ink serving as a colorant, it is preferable to use the light absorbing material in the form of an ink set including inks of four colors.

Many inorganic pigments are formed of particles having a volume average particle diameter greater than 10 micrometers. When using an inorganic pigment having a volume average particle diameter of 10 micrometers or greater as a colorant, it is preferable that the colorant be a liquid. When the colorant is a liquid, there is an advantage that the colorant can be maintained in a stable state without using forces other than non-electrostatic adhesive forces, i.e., without using, for example, an electrostatic force. In this case, the image forming method of the present disclosure is very effective compared with inkjet recording methods that cannot be highly expected as stable continuous printing processes because obvious nozzle clogging and ink sedimentation tend to occur. Moreover, the image forming method of the present disclosure is very effective compared with electrophotography methods that cannot be established as stable continuous printing processes when colorant particles cannot be sufficiently charged because of having a small surface area.

Examples of the dye include monoazo dyes, polyazo dyes, metal complexed azo dyes, pyrazolone azo dyes, stilbene azo dyes, thiazole azo dyes, anthraquinone derivatives, anthrone derivatives, indigo derivatives, thioindigo derivatives, phthalocyanine dyes, diphenylmethane dyes, triphenylmethane dyes, xanthene dyes, acridine dyes, azine dyes, oxazine dyes, thiazine dyes, polymethine dyes, azomethine dyes, quinoline dyes, nitro dyes, nitroso dyes, benzoquinone dyes, naphtoquinone dyes, naphthalimide dyes, and perinone dyes.

The viscosity of the colorant is not particularly limited and may be appropriately selected depending on the intended purpose.

A liquid colorant that can permeate a recording medium may feather or bleed when the colorant is attached on the recording medium. As compared, a high-viscosity colorant that can be handled by the image forming apparatus of the present disclosure has a drying speed higher than the speed at which the colorant permeates a recording medium, and can reduce bleeding in particular, improve color developability, and sharpen edge portions. Therefore, a high-viscosity colorant can form a high-quality image. Moreover, for half-toning by overprinting that overlays a colorant over a colorant, a high-viscosity colorant can reduce bleeding that is due to increase in the amount of the colorants.

Moreover, the present image forming method attaches a liquid colorant by flying the liquid colorant. Therefore, as compared with, for example, so-called thermal transfer methods that melt a colorant over a film-shaped colorant bearing member by heat and transfer the melted colorant, the present image forming method can realize preferable recording even when a recording medium has minute bosses and recesses.

The average thickness of the colorant is not particularly limited, may be appropriately selected depending on the intended purpose, and is preferably 100 micrometers or less. When the average thickness of the colorant is 100 micrometers or less, the energy for flying the colorant can be reduced. Therefore, there are advantages that the colorant bearing member is durable and the colorant composition is not likely to decompose when the colorant is an organic substance. The preferable range of the average thickness varies depending on the recording medium and the intended purpose.

For example, when coat paper or a smooth film used in typical offset printing is used as a recording medium, the average thickness of the colorant is preferably 0.5 micrometers or greater but 5 micrometers or less. When the average thickness of the colorant is in the preferable range, color difference due to minute variation in the average thickness of the recording medium cannot easily be recognized by human eyes. Hence, there are advantages that an image having a high saturation can be formed even over coat paper, and a sharp image is likely to be expressed without considerable dot gains of halftone dots.

For example, when using a recording medium having a greater surface roughness than coat paper and films, such as high-quality paper used in offices, the average thickness of the colorant is preferably 3 micrometers or greater but 10 micrometers or less. When the average thickness of the colorant is within the preferable range, a good image quality is likely to be obtained without influence of the surface roughness of the recording medium. Besides, particularly when a full-color image is expressed with process-color colorants, an obvious feeling of surface height difference is not likely to be felt even when films (layers) of a plurality of colorants are overlaid.

Moreover, for example, for printing in which cloths or fibers are dyed, the average thickness of the colorant often needs to be 5 micrometers or greater when attaching the colorant on, for example, cotton, silk, and chemical fibers serving as recording media. This is because a more colorant is often needed because the thickness of the fiber is greater than the thickness of paper.

When the light absorbing material is a liquid, it is preferable that the light absorbing material contain a surface tension regulator.

It has been found possible to form a flying body having a desired size by adjusting the surface tension of the light absorbing material within a preferable range. That is, when the flying body generating method of the present disclosure is applied to an image forming method and a three-dimensional object producing method, it is possible to land a liquid droplet (light absorbing material) in a desired amount on an attaching target.

The present inventors have conducted an experiment described below in order to study the relationship between the static surface tension of the light absorbing material and the volume of a flying body to be formed.

<Verification Experiment>

An ink having the following composition was prepared as the light absorbing material.

UV ink (BESTCURE UV CORE TYPE-A CRIMSON; obtained from T&K TOKA Corporation) 75 parts by weight Viscosity modifier (BESTCURE UV DG REDUCER; obtained from T&K TOKA Corporation) 25 parts by weight Samples 1 to 3 were prepared by adding a surface tension regulator (BYK-UV3500; obtained from BYK GmbH) to the ink described above by 0% by mass (not added), 1% by mass, and 2% by mass relative to the total amount of the ink.

The surface tensions of the samples 1 to 3 were measured with an automatic surface tensiometer CBVP-Z obtained from Kyowa Interface Science Co., Ltd. The results are presented in Table 1 below.

Donor coating was applied with a film thickness of 8 micrometers. A Teflon (registered trademark) sheet having a low surface energy was used as an acceptor. This was because a solid having a low surface energy had a low tendency to be wetted, and the contact angle of a liquid droplet when attached on the solid was large. This would make it possible to accurately measure the height of a liquid droplet for calculation of the volume of the liquid droplet. The volume when calculated from the cross-sectional profile plotted in FIG. 15C is expressed as follows.

$$\text{Volume} = \pi \int r(z)^2 dz \qquad \text{(Formula B)}$$

In Formula B, z represents the height direction of the liquid droplet, an r(z) represents the distance from the center in the height z. The liquid droplet profile was assumed to be axisymmetric.

Figure 12A:
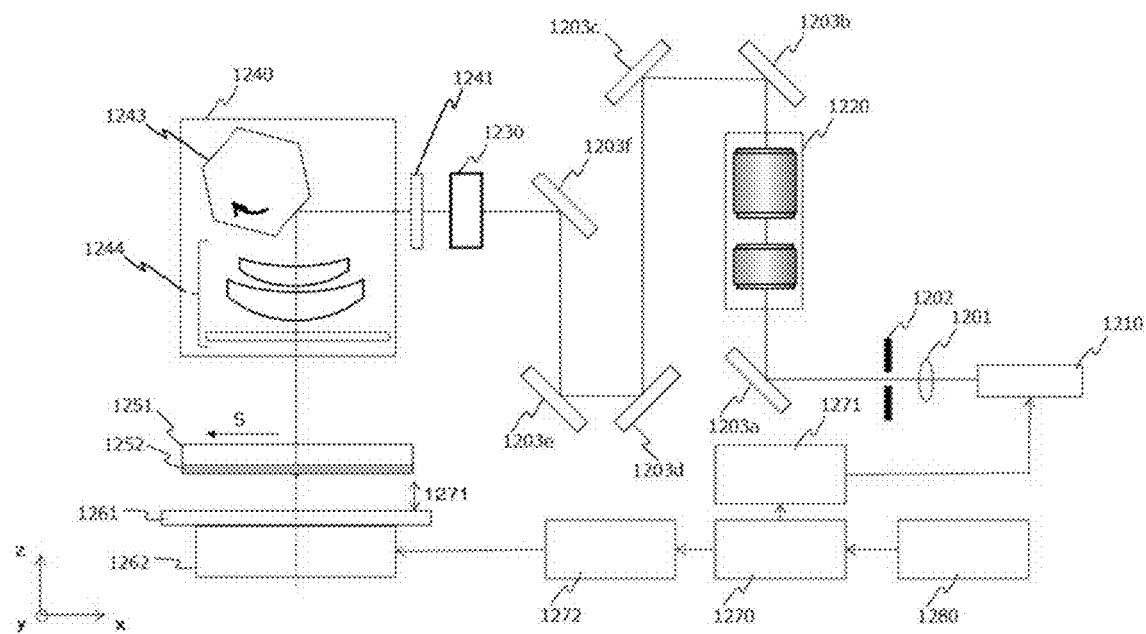
FIG. 12A is an exemplary view illustrating another example of a flying body generating apparatus of the present disclosure.

A flying body was generated using the flying body generating apparatus of the present disclosure illustrated in FIG. 12A, and the volume of the generated flying body was calculated by 3D profile measurement. The result is presented in Table 1 and FIG. 10.

Figure 10:
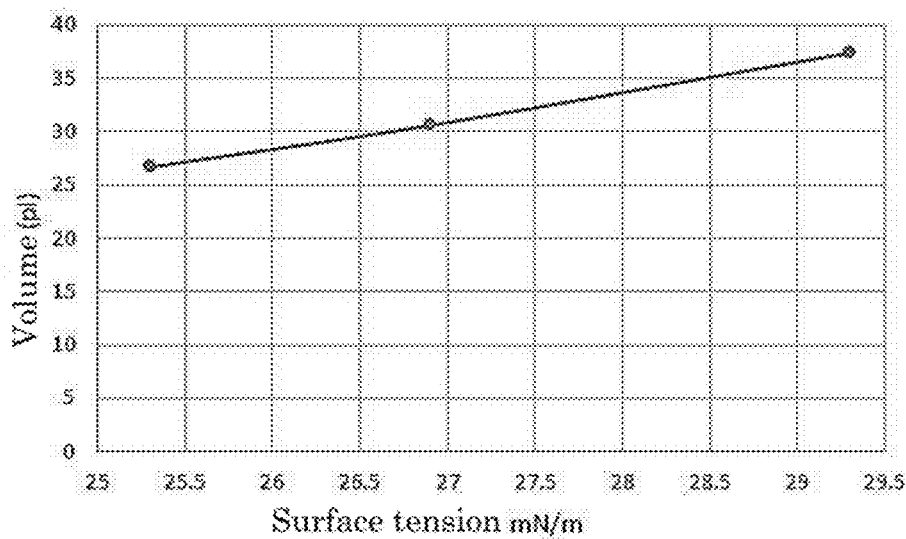
FIG. 10 is a graph plotting an example of a relationship between static surface tension of a light absorbing material and volume of a flying body.

As presented in Table 1 and FIG. 10, it was revealed that there was a correlation between the static surface tension of the light absorbing material and the volume of the liquid droplet of the flying body to be formed. That is, it was found possible to control the volume of the flying body by controlling the static surface tension of the light absorbing material.

TABLE 1

| Content of surface tension regulator (% by mass) | Surface tension (mN/m) | Volume (pl) |
|---|---|---|
| 0 | 29.3 | 37.4 |
| 1 | 26.9 | 30.6 |
| 2 | 25.3 | 26.7 |

FIG. 10 plots the relationship between the surface tension and the liquid droplet volume. It was confirmed that the liquid droplet volume became smaller as the surface tension became lower. This result supports simulations in documents (see M. S. Brown, C. F. Brasz, Y. Ventikos and C. B. Arnold, "Impulsively actuated jets from thin liquid films for high resolution printing applications," J Fluid Mech 709, (2012), 341-370). The reason the liquid droplet volume became smaller as the surface tension became lower is described below. According to Wilhelmy plate method (see K. Yum and M. Yu, "Measurement of wetting properties of individual boron nitride nanotubes with the Wilhelmy method using a nanotube-based force sensor," Nanoletters, 6 (2) (2006), pp. 329-333), a wetting force F (acting in a direction to shrink an ink film) is given by the formula below.

$$F = L \times v \times \cos\theta \quad \text{(Formula C)}$$

In Formula (C), v represents the surface tension of a liquid, L represents a perimeter, and θ represents a contact angle. When it is assumed that LIFT involves the same dynamics as above, the force F acting in the direction to shrink an ink film, represented by Formula C, is expressed as follows.

$$F = 2\pi r \times v$$

where r represents a liquid droplet radius over a contact surface.

In order to fly a liquid droplet with a high quality without scattering, it is desirable to reduce the vaporizing pressure of bubble ring as much as possible but so long as a liquid droplet can be flown.

Due to the surface tension v, there acts a force F in a direction opposite to the flying direction (i.e., a force F in a direction toward the transparent body).

The surface tension as used herein refers to the static surface tension in the general sense of the term.

Accordingly, when the surface tension is high, a liquid droplet cannot overcome the force F and fly without a relatively high pressure. That is, a liquid droplet having a large volume is formed when the surface tension is high, and a liquid droplet having a small volume can be formed when the surface tension is low.

In image formation, small liquid droplets can increase the resolution, but have a poor throughput. Therefore, it is appropriate to set an optimum surface tension depending on the application. Influence of the gravity may be ignored because influence of the gravity is insignificant compared with pressure.

The static surface tension of the light absorbing material is preferably 15 mN/m or higher but 73 mN/m or lower and more preferably 20 mN/m or higher but 40 mN/m or lower.

For surface tension regulation, an additive having a surface tension regulating function (hereinafter, referred to as surface tension regulator) is appropriately added in the ink used.

The surface tension regulator is not particularly limited and may be appropriately selected depending on the intended purpose so long as the surface tension regulator reduces the surface tension of the light absorbing material.

For example, a commercially available surfactant can be generally used as the surface tension regulator. Examples of the surface tension regulator include ionic surfactants, non-ionic surfactants, silicone-based surface conditioners, fluorine-based surface conditioners, and acrylic-based surface conditioners. These surface tension regulators may be appropriately selected depending on the properties (for example, water-base, oil-base, and UV-curability) of the light absorbing material to which the surface tension regulator is applied.

Among these surface tension regulators, one that does not contain much of a volatile solvent and has a solid content of 50% or greater but 100% or less is preferable.

Specific examples of the surface tension regulator include acrylic siloxane-based BYK-UV3500 and BYK-UV3530 and polyether siloxane-based BYK-UV3510, and polyether-based BYK-UV3535, which are available from BYK GmbH, and acrylic-based UVX-35 and UVX-36 and acrylic siloxane-based UVX-272, which are available from Kusunoki Kasei Co., Ltd.

The content of the surface tension regulator is preferably 0.1% by mass or greater but 5% by mass or less and more preferably 0.5% by mass or greater but 2% by mass relative to the total amount of the light absorbing material.

As the method for measuring the static surface tension, Wilhelmy method of bringing a liquid into contact with a platinum plate may be used.

Examples of a standard measuring instrument include an automatic surface tensiometer DY-300 available from Kyowa Interface Science Co., Ltd.

Next, embodiments of the flying body generating apparatus of the present disclosure will be described with reference to the drawings.

FIG. 11A is an exemplary view illustrating an example of the flying body generating apparatus of the present disclosure. For expediency, the drawing illustrates an axisymmetric model. As illustrated in FIG. 11A, the flying body generating apparatus includes an unillustrated light source, beam transforming optical systems 712 and 712', a galvano scanner 713 serving as a scanning optical system, and a condenser lens 714 serving as a light condensing optical system. A base material 716 having a light absorbing material 717 over a surface thereof can be set on the sample table of the flying body generating apparatus. The flying body generating apparatus also includes an unillustrated gap maintaining member configured to provide a gap 732 between the base material and an acceptor substrate 718.

Figure 11B:
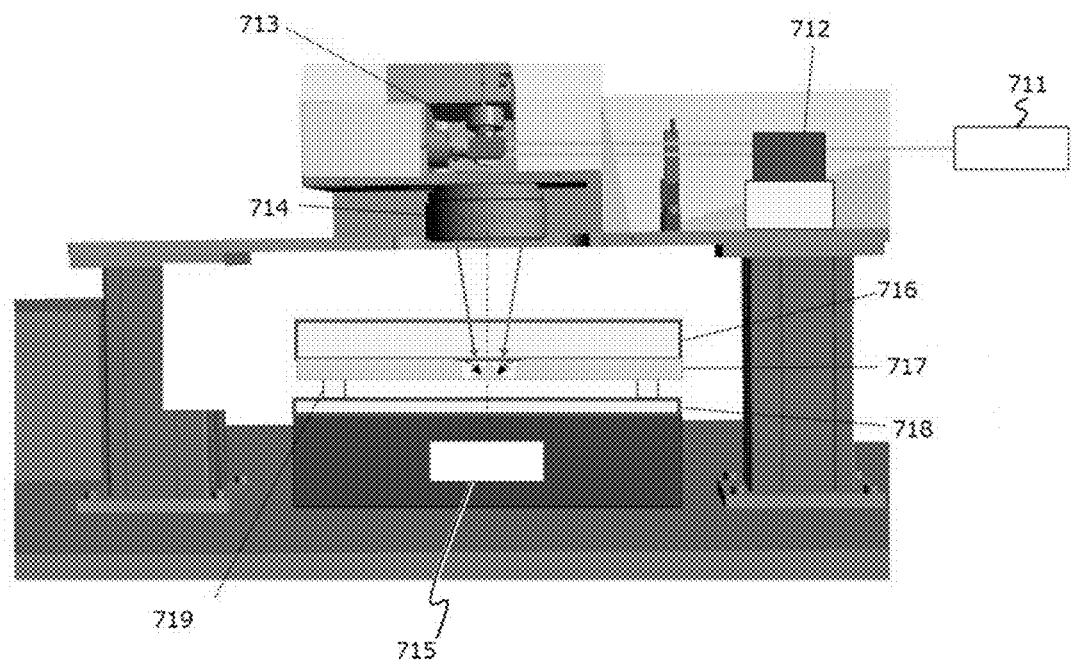
FIG. 11B is an exemplary view illustrating another example of a flying body generating apparatus of the present disclosure.

FIG. 11B is a schematic view illustrating the configuration of FIG. 11A more simply. For expediency, the drawing illustrates an axisymmetric model. As illustrated in FIG. 11B, the flying body generating apparatus includes a light source 711, a beam transforming optical system 712, a (X-Y) galvano scanner 713 serving as a scanning optical system, and a condenser lens 714 serving as a light condensing optical system. A transparent body (base material) 716 having a light absorbing material 717 over at least part of a surface thereof can be set on a sample table 715 of the flying body generating apparatus. The flying body generating apparatus also includes a gap maintaining member 719 configured to provide a gap between the transparent body (base material) 716 and an attaching target (acceptor base material (substrate)).

In the example of the flying body generating apparatus illustrated in FIG. 11B, a light absorbing material flying unit including the light source 711, the beam transforming optical system 712, the galvano scanner 713 serving as a scanning optical system, and the condenser lens 714 irradiates a surface of the transparent body (base material) 716 opposite to the surface over which the light absorbing material 717 is disposed with an annular laser beam, to fly the light absorbing material 717 in the emitting direction of the annular laser beam. In the example of the flying body generating apparatus illustrated in FIG. 11B, the flown light absorbing material 717 (flying body) attaches on the attaching target (target) 718.

Figure 11C:
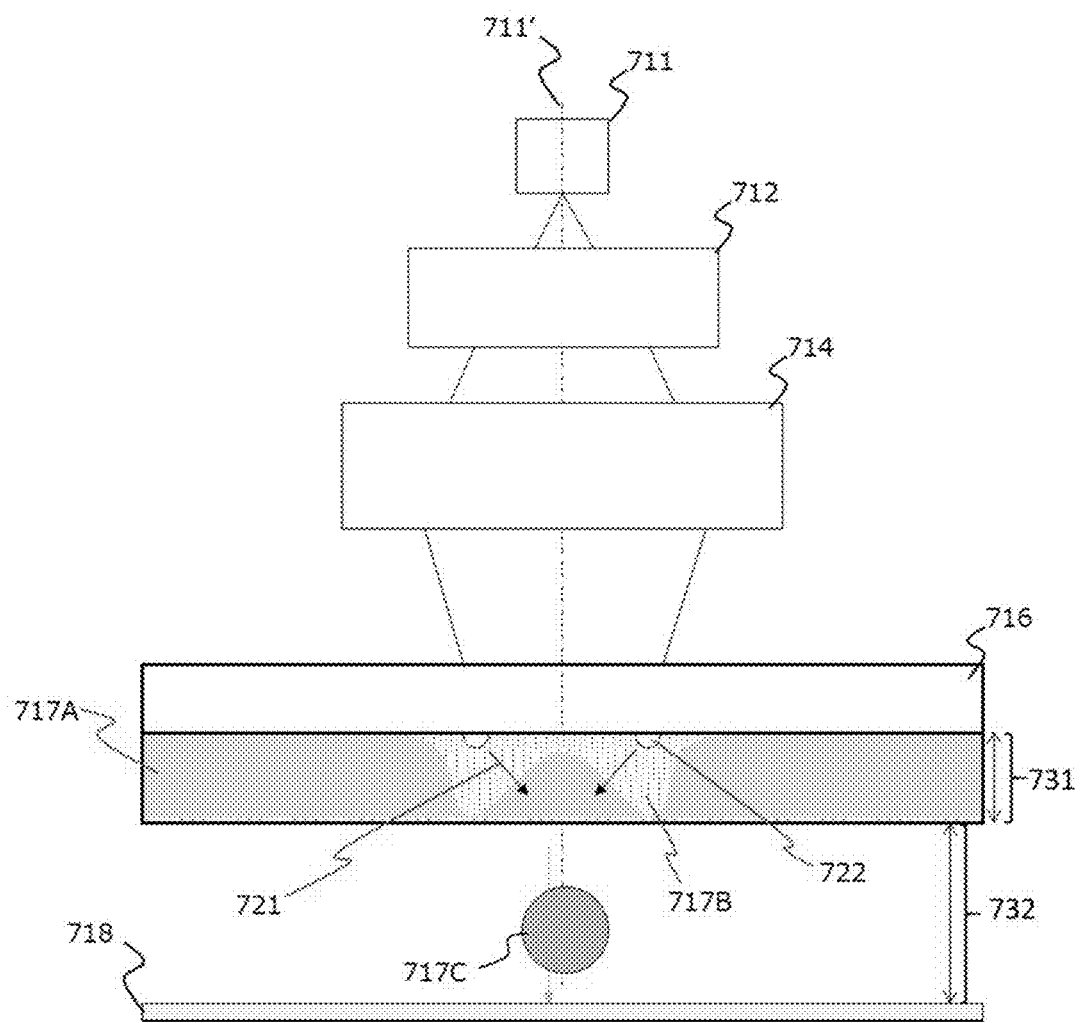
FIG. 11C is an exemplary view illustrating another example of a flying body generating apparatus of the present disclosure.

FIG. 11C is a view illustrating the example of the configuration of the flying body generating apparatus illustrated in FIG. 11B more simply, and also illustrating a state where a vaporized region 722 having a pressure higher than or equal to an outside pressure is generated along an outer circumference of a region irradiated with a laser beam at an interface between a base material and a (high-viscosity) light absorbing material 717A.

As illustrated in FIG. 11C, when a surface of a transparent body (base material) 716 opposite to a surface over which the high-viscosity light absorbing material 717A having a thickness 731 is disposed with a laser beam, the high-viscosity light absorbing material 717A irradiated with the laser beam generates a viscosity-lowered region 717B, and a vaporized region 722, which is the high-viscosity light absorbing material 717A vaporized, at an interface between the transparent body 716 and the high-viscosity light absorbing material 717A in a manner that the vaporized region 722 surrounds an optical axis 711'. The generated vaporized region 722 expands to generate an inward pressure 721 (a pressure toward the optical axis). The inward pressure 721 pushes out the high-viscosity light absorbing material 717A surrounded by the viscosity-lowered region 717B in the emitting direction (optical axis direction) of the laser beam, and the high-viscosity light absorbing material 717A pops out into the gap 732 between the high-viscosity light absorbing material 717A and the attaching target (target) 718 in the form of a liquid droplet 717C. The flying liquid droplet 717C that has popped out flies in the emitting direction of the laser beam.

FIG. 12A illustrates an example of another embodiment of the flying body generating apparatus of the present disclosure.

The flying body generating apparatus includes a laser light source 1210, a beam shaping optical system 1220, a beam transforming optical system 1230, a scanning optical system 1240, an attaching target medium 1261, a moving stage 1262 configured to move a sample, and a host computer 1270. The host computer 1270 is configured to output an input signal into an exposure condition setting unit 1271 based on process target image data 1280 to cause an output from the light source 1210 based on an output signal from the exposure condition setting unit 1271.

The laser beam output from the laser light source 1210 passes through a condenser lens 1201, and a beam expander (BEX) 1202 expands the laser beam to an appropriate beam. Posterior to the beam expander 1202, the flying body generating apparatus includes a unit configured to vary the magnification of the cross-sectional shape of the incident laser beam and a unit configured to convert the phase distribution of the incident laser beam wavefront in order to form a high-quality beam profile on a sample surface.

The incident laser beam passes through the beam shaping optical system 1220, and many loopback mirrors needed for scanning the laser beam three-dimensionally in x, y, and z directions. In FIG. 12A, there are six loopback mirrors 1203a to 1203f. However, ten or more mirrors and an optical element 1241 may be provided.

After passing through the plurality of mirrors, the optical element 1241, and the beam transforming optical system 1230, the laser beam is reflected by the scanning optical system 1240 including an optical deflector 1243 such as a galvano mirror and a polygon mirror, and the surface or the interior of the base material 1251 is irradiated with the laser beam through a condenser lens 1244. For example, the laser beam may be scanned in the direction of S in FIG. 12A while the base material is irradiated with the laser beam.

The sample stage controls the sample table in a manner that the gap 1271 between the film (layer) 1252 of the light absorbing material and the attaching target 1261 becomes a desired distance based on a coordinates control signal 1272 from the host computer 1270. A smaller gap is preferred in order to reduce scattering, whereas a larger gap is preferred in view of operability, reproducibility, and throughput. Hence, the gap is preferably 0.05 mm or greater but 0.5 mm or less.

Figure 12B:
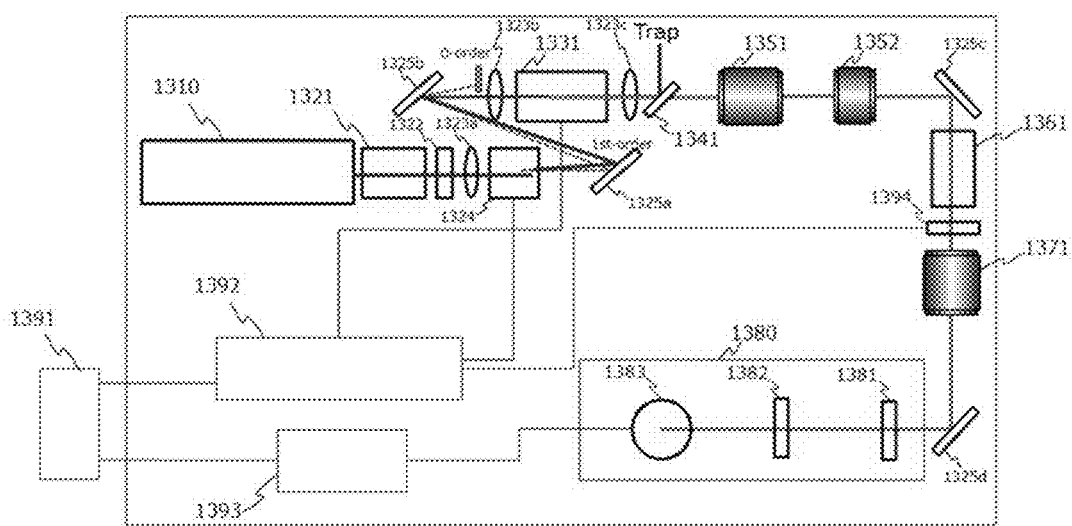
FIG. 12B is an exemplary view illustrating another example of a flying body generating apparatus of the present disclosure.

FIG. 12B illustrates another example of the embodiment of the flying body generating apparatus of the present disclosure.

The flying body generating apparatus illustrated in FIG. 12B includes a scanning optical system mounted with a galvano scanner.

A laser emitted from a Nd:YAG laser light source unit 1310 having a wavelength of 1,064 nm passes through a spatial isolator 132, a λ/4 plate 1322, and a collimating lens 1323.

An acoustooptic modulator (AOM) 1324 time-divides the laser to 0-order light and primary light based on an ON/OFF signal from a PC 1391 and a controller 1392. In this way, it is possible to control the frequency of the laser light source 1310. The controller 1392 is also configured to control operations of a mechashutter 1394.

The 0-order light is cut when passing through mirrors 1325a and 1325b and a lens 1323a, and only the primary light passes a nonlinear optical crystal (SHG element) 1331. As a result, under nonlinear optical effects, a second harmonic (SHG) is generated, and green light having a wavelength of 532 nm is generated.

A harmonic separator HS 1341 obtains a beam having a single color of green by separating a fundamental harmonic and a second harmonic from each other.

The phase distribution and the intensity distribution of the green light are corrected by an aberration correcting element 1351 or an aspect ratio magnification variation element 1352, and then the green light passes a zoom lens 1361 and comes incident to a beam transforming element 1371 configured to transform the light into an annular beam.

Subsequently, the annular beam passes a mirror 1325d, ND 1381, and another optical element 1382 and is reflected by an optical deflector 1380 such as a galvano mirror 1383, and the surface or the interior of the sample is irradiated with the annular beam through a condenser lens. A galvano controller is provided to control the optical deflector 1380 such as the galvano mirror 1383.

(Image Forming Method and Image Forming Apparatus)

An image forming method of the present disclosure includes a light absorbing material flying step of irradiating a surface of a base material opposite to a surface over which a light absorbing material is disposed with a laser beam to fly the light absorbing material in an emitting direction of the laser beam, and a transferring step of transferring the light absorbing material flown, to a transfer medium. The image forming method generates a vaporized region having a pressure higher than or equal to an outside pressure at an interface between the base material and the light absorbing material in a manner that the vaporized region surrounds the optical axis of the laser beam emitted. The image forming method further includes other steps as needed.

The image forming apparatus of the present disclosure includes a light absorbing material flying unit configured to irradiate a surface of a base material opposite to a surface over which a light absorbing material is disposed with a laser beam to fly the light absorbing material in an emitting direction of the laser beam, and a transferring unit configured to transfer the light absorbing material flown, to a transfer medium. The image forming apparatus generates a vaporized region having a pressure higher than or equal to an outside pressure at an interface between the base material and the light absorbing material in a manner that the vaporized region surrounds the optical axis of the laser beam emitted. The image forming apparatus further includes other units as needed.

The image forming method of the present disclosure can be suitably performed by the image forming apparatus of the present disclosure. The light absorbing material flying step can be suitably performed by the light absorbing material flying unit. The transferring step can be suitably performed by the transferring unit. The other steps can be suitably performed by the other units.

The image forming method and the image forming apparatus of the present disclosure are the same as the flying body generating method and the flying body generating apparatus of the present disclosure except the transferring step and the transferring unit. Therefore, description of the image forming method and the image forming apparatus will be skipped except the transferring step and the transferring unit.

<Transferring Step and Transferring Unit>

The transferring step is a step of transferring the light absorbing material flown to a transfer medium.

The transferring unit is a unit configured to transfer the light absorbing material flown, to a transfer medium.

The transferring unit is not particularly limited and may be appropriately selected depending on the intended purpose. Examples of the transferring unit include a unit including a mechanism configured to bring a flying body generated from the light absorbing material into contact with the transfer medium. Specifically, the transferring unit may include, for example, a mechanism configured to adjust the gap between the attaching target and the light absorbing material, and a mechanism configured to convey the attaching target.

—Transfer Medium—

The transfer medium (attaching target) is not particularly limited and may be appropriately selected depending on the intended purpose so long as a liquid column or a liquid droplet generated from the light absorbing material can contact the transfer medium. Examples of the transfer medium include a recording medium and an intermediate transfer belt used in image forming apparatuses.

<Other Steps and Other Units>

Examples of the other steps include a light absorbing material feeding step, a film thickness controlling step, a beam scanning step, an attaching target conveying step, a fixing step, and a controlling step.

Examples of the other units include a light absorbing material feeding unit, a film thickness controlling unit, a beam scanning unit, an attaching target conveying unit, a fixing unit, and a controlling unit.

The light absorbing material flying unit, the base material, the light absorbing material feeding unit, and the beam scanning unit may be handled integrally as a light absorbing material flying unit.

The light absorbing material feeding unit is not particularly limited and may be appropriately selected depending on the intended purpose so long as the light absorbing material feeding unit can feed the light absorbing material to an optical path of the laser beam between the light absorbing material flying unit and the attaching target. For example, the light absorbing material feeding unit may feed the light absorbing material through a cylindrical base material disposed on an optical path.

Specifically, when feeding the light absorbing material, which is a liquid, to the base material, it is preferable to provide a feeding roller and a regulating blade as the light absorbing material feeding unit, because it is possible to feed the light absorbing material having a constant average thickness to a surface of the base material using very simple configurations.

In this case, with the surface of the feeding roller partially dipped in a storage tank storing the light absorbing material, the feeding roller rotates while bearing the light absorbing material over the surface thereof, and comes into contact with the base material and feeds the light absorbing material to the base material. The regulating blade is disposed downstream of the storage tank in the rotation direction of the feeding roller, regulates the light absorbing material borne over the feeding roller to make the average thickness of the light absorbing material uniform and stabilize the amount of the light absorbing material to be flown. By making the average thickness very small, it is possible to suppress the amount of the light absorbing material to be flown, making it possible to suppress scattering of the light absorbing material, attach the light absorbing material on the attaching target as a minute dot, and suppress dot gain, which is growth of halftone dots. The regulating blade may be disposed downstream of the feeding roller in the rotation direction of the base material.

When the light absorbing material has a high viscosity, it is preferable that the constituent material of the feeding roller have elasticity at least over the surface in order that the feeding roller has a secure contact with the base material. When the light absorbing material has a relatively low viscosity, examples of the feeding roller include a gravure roll, a microgravure roll, and a forward roll used in precision wet coating.

A light absorbing material feeding unit that is free of a feeding roller may form a film (layer) of the light absorbing material over a surface of the base material by bringing the base material into direct contact with the light absorbing material in a storage tank and subsequently scraping away any excessive light absorbing material with, for example, a wire bar. The storage tank may be provided separately from the light absorbing material feeding unit, and the light absorbing material may be delivered to the light absorbing material feeding unit through, for example, a hose.

The light absorbing material feeding step is not particularly limited and may be appropriately selected depending on the intended purpose so long as the light absorbing material feeding step is a step of feeding the light absorbing material to the optical path of the laser beam between the light absorbing material flying unit and the attaching target. The light absorbing material feeding step can be suitably performed using, for example, the light absorbing material feeding unit.

The film thickness controlling unit is a unit configured to control the thickness of the light absorbing material applied over the surface of the base material, by being disposed in a manner to come into contact with the surface of the base material with a predetermined gap from the surface of the base material. This will be described with reference to the drawings.

Figure 13:
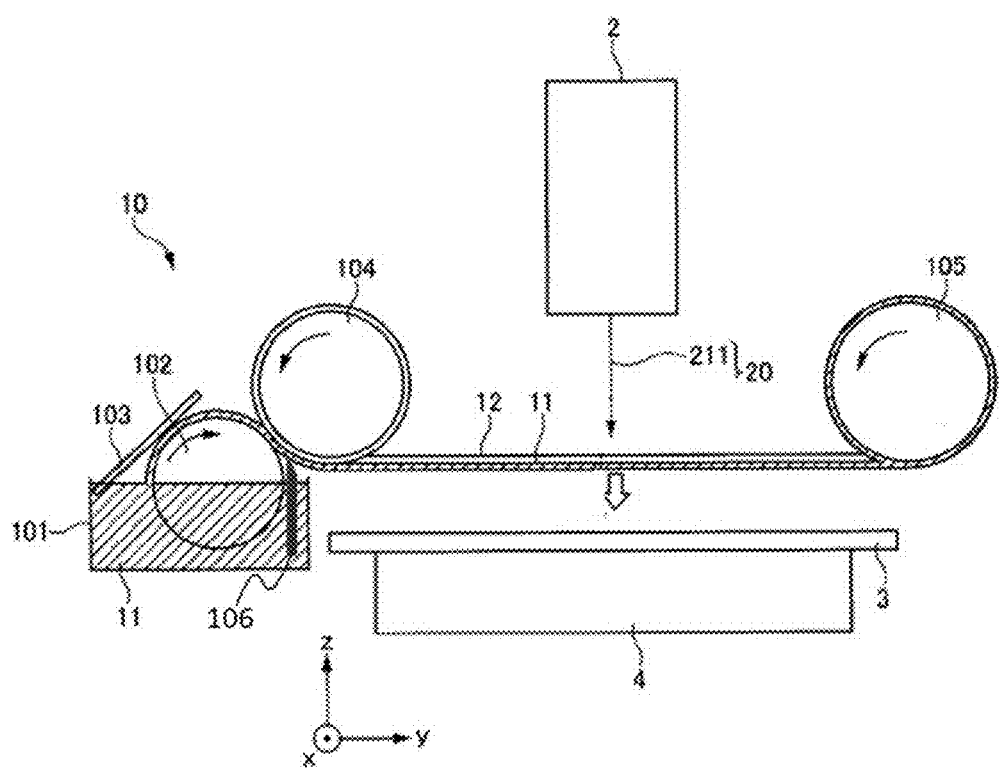
FIG. 13 is an exemplary view illustrating an example of a light absorbing material feeding unit.

FIG. 13 is a diagram illustrating an example of the configuration of the light absorbing material feeding unit 10.

The light absorbing material feeding unit 10 includes a storage tank 101 storing the light absorbing material 11, a feeding roller 102, a regulating blade 103, a conveying roller 104, and a sheet collecting roller 105.

The feeding roller 102 is disposed in a manner to contact the conveying roller 104, and is partially dipped in the light absorbing material 11 in the storage tank 101. The feeding roller 102 brings the light absorbing material 11 to attach to the circumferential surface thereof while rotating in the direction of the arrow (clockwise direction) by means of an unillustrated rotation driving unit or by following the rotation of the conveying roller 104.

The regulating blade 103 makes the average thickness of the light absorbing material 11 attached on the circumferential surface of the feeding roller 102 uniform Subsequently, the light absorbing material is applied over the surface of the base material and passes the film thickness controlling unit 106, and through this passing, the light absorbing material applied over the surface of the base material is scraped off in a manner that the film thickness of the light absorbing material becomes equal to the length of the gap between the film thickness controlling unit 106 and the surface of the base material. By controlling the gap between the film thickness controlling unit 106 and the surface of the base material in this way, it is possible to apply the light absorbing material having a desired film thickness over the surface of the base material.

Subsequently, the light absorbing material 11 is relocated to a transparent sheet 12 sent out by the conveying roller 104. In this way, the light absorbing material 11 is fed in the form of a film (layer). The transparent sheet 12 bears the fed light absorbing material 11 over a surface thereof facing the attaching target 3 by an intermolecular force. The bearing force of the transparent sheet 12 for bearing the light absorbing material 11 may be enhanced by air suction or electrosorption.

The transparent sheet 12 is previously wound around the conveying roller 104, and one end of the wound transparent sheet 12 is connected to the sheet collecting roller 105 disposed apart from the conveying roller 104 in the +y direction.

The sheet collecting roller 105 winds up the transparent sheet 12 by being rotated by a driving unit such as a motor. By this winding operation, the transparent sheet 12 travels in the +y direction. The conveying roller 104 rotates by following the travelling of the transparent sheet 12, and sends out the transparent sheet 12 wound around the conveying roller 104 to the sheet collecting roller 105.

The transparent sheet 12 travels while bearing the light absorbing material 11, and when arriving at a position counter to a light irradiator 2 disposed between the conveying roller 104 and the sheet collecting roller 105, is irradiated with a laser beam 211 for flying emitted from the light irradiator 2. Then, the operation of flying the light absorbing material 11 from the transparent sheet 12 and the operation of fixing the light absorbing material 11 over the attaching target 3 are performed.

By rotation of the conveying roller 104, the light absorbing material 11 fed over the transparent sheet 12 is continuously delivered to the position irradiated with the laser beam 211 for flying. After the operations, the sheet collecting roller 105 collects the light absorbing material 11 together with the transparent sheet 12.

In this way, the film thickness controlling unit can control the film thickness of the light absorbing material. As described above, in the present disclosure, by controlling the film thickness of the light absorbing material fed over the surface of the base material, it is possible to control the liquid droplet diameter of the light absorbing material. As a result, a desired resolution can be obtained and the throughput can be controlled. Hence, using the film thickness controlling unit as one measure for feeding the light absorbing material, it is possible to control the resolution.

The beam scanning unit is not particularly limited and may be appropriately selected depending on the intended purpose so long as the laser scanning unit can scan a laser beam over the light absorbing material. For example, the beam scanning unit may include a reflecting mirror configured to reflect a laser beam emitted by the light absorbing material flying unit toward the light absorbing material, and a reflecting mirror driving unit configured to change the angle and the position of the reflecting mirror to scan the laser beam over the light absorbing material.

The beam scanning step is not particularly limited and may be appropriately selected depending on the intended purpose so long as the beam scanning step is a step of scanning a laser beam over the light absorbing material. For example, the beam scanning step can be suitably performed using the beam scanning unit.

The attaching target conveying unit is not particularly limited and may be appropriately selected depending on the intended purpose so long as the attaching target conveying unit can convey the attaching target. Examples of the attaching target conveying unit include a pair of conveying rollers.

The attaching target conveying step is not particularly limited and may be appropriately selected depending on the intended purpose so long as the attaching target conveying step is a step of conveying the attaching target, and can be suitably performed using, for example, the attaching target conveying unit.

The fixing unit is not particularly limited and may be appropriately selected depending on the intended purpose so long as the fixing unit can fix the light absorbing material attached over the attaching target. Examples of the fixing unit include a thermocompression bonding system using a heating/pressurizing member.

The heating/pressurizing member is not particularly limited and may be appropriately selected depending on the intended purpose. Examples of the heating/pressurizing member include a heating roller, a pressurizing roller, and a combination of a heating roller and a pressurizing roller. Other examples of the heating/pressurizing member include a combination of these members with a fixing belt, and a combination of these members but using a heating block instead of the heating roller.

It is preferable that the pressurizing roller have a pressurizing surface that moves at the same speed as the attaching target conveyed by the attaching target conveying unit, in terms of suppressing image degradation due to friction. Above all, a pressurizing roller including an elastic layer near the surface thereof is preferable because such a roller can easily contact and pressurize the attaching target. Moreover, a pressurizing roller including at the outermost surface, a water-repellent surface layer formed of a material having a low surface energy such as silicone-based water-repellent materials and fluorine compounds is particularly preferable in terms of suppressing image disorder due to adhesion of the light absorbing material to the surface.

Examples of the water-repellent surface layer formed of a silicone-based water-repellent material include a coating film formed of a silicone-based release agent, an enameled film formed of a silicone oil or various kinds of modified silicone oils, a coating film formed of silicone varnish, a silicone film formed of a silicone rubber, and a coating film formed of a composite material between a silicone rubber and various metals, rubbers, plastics, and ceramics.

Examples of the water-repellent surface layer formed of a fluorine compound include a coating film formed of a fluorine resin, a coating film formed of an organic fluorine compound, an enameled film or an adsorption film formed of an fluorine oil, a coating film formed of a fluorine rubber, and a coating film formed of a composite material between a fluorine rubber and various metals, rubbers, plastics, and ceramics.

The heating temperature of the heating roller is not particularly limited, may be appropriately selected depending on the intended purpose, and is preferably 80 degrees C. or higher but 200 degrees C. or lower.

The fixing belt is not particularly limited and may be appropriately selected depending on the intended purpose so long as the fixing belt has heat resistance and a high mechanical strength. Examples of the fixing belt include films of, for example, polyimide, PET, and PEN. For the fixing belt, it is preferable to use the same material as the material forming the outermost surface of the pressurizing roller in terms of suppressing image disorder due to adhesion of the light absorbing material to the surface. By making the thickness of the fixing belt small, it is possible to suppress the energy for heating the belt, making it possible to use the fixing belt as soon as the fixing belt is turned on. Here, the temperature and the pressure vary depending on the composition of the light absorbing material to be fixed. However, the temperature is preferably 200 degrees C. or lower in terms of energy saving, and the pressure is preferably 1 kg/cm or lower in terms of rigidity of the apparatus.

When using two or more kinds of light absorbing materials, it is possible to fix the light absorbing material each time the light absorbing material of any color is attached over the attaching target, or fix all of the light absorbing materials in a state that all of the light absorbing materials are attached and overlaid one upon another over the attaching target.

When the light absorbing material has an extremely high viscosity and it is difficult to improve the attaching speed at which the light absorbing material is attached over the attaching target because of slow drying of the light absorbing material, it is possible to additionally perform heating of the attaching target to prompt drying.

When the light absorbing material has slow permeation and slow wetting over the attaching target and such a light absorbing material is dried in a state that the light absorbing material attached is not sufficiently smoothed, the surface of the attaching target over which the light absorbing material is attached becomes rough and may not be able to obtain glossiness. In order that the surface of the attaching target may obtain glossiness, the fixing unit may perform fixing by pressurization in a manner to crush the light absorbing material attached over the attaching target and fix the light absorbing material as if to squeeze the light absorbing material into the attaching target, so that the attaching target may have a small surface roughness.

The fixing unit is needed in order to fix the light absorbing material on the attaching target particularly when the light absorbing material is a solid formed by compacting a powder. As needed, a known optical fixing unit may be used together with the fixing unit.

The fixing step is not particularly limited and may be appropriately selected depending on the intended purpose so long as the fixing step is a step of fixing the light absorbing material attached over the attaching target on the attaching target, and can be suitably performed using, for example, the fixing unit.

The controlling unit is not particularly limited and may be appropriately selected depending on the intended purpose so long as the controlling unit can control the operations of each unit. Examples of the controlling unit include devices such as a sequencer and a computer.

The controlling step is a step of controlling each step and can be suitably performed by the controlling unit.

—Attaching Target—

The attaching target (transfer medium) is not particularly limited and may be appropriately selected depending on the intended purpose. Examples of the attaching target include a recording medium over which an image is formed, and an object support substrate over which a three-dimensional object is produced.

—Recording Medium—

The recording medium is not particularly limited and may be appropriately selected depending on the intended purpose. Examples of the recording medium include coat paper, high-quality paper, films, cloths, and fibers.

The gap between the attaching target and the light absorbing material is not particularly limited and may be appropriately selected depending on the intended purpose so long as the attaching target and the light absorbing material are kept contactless from each other, and is preferably 0.05 mm or greater but 5 mm or less, more preferably 0.10 mm or greater but 2.0 mm or less, particularly preferably 0.2 mm or greater but 1.0 mm or less, and most preferably 0.10 mm or greater but 0.50 mm or less. When the gap between the attaching target and the light absorbing material is in the preferable range, there is an advantage that the accuracy of the position at which the light absorbing material is attached over the attaching target is not likely to degrade. By keeping the attaching target and the light absorbing material contactless from each other, it is possible to attach the light absorbing material over the attaching target regardless of the compositions of the light absorbing material and the attaching target. The present disclosure is particularly excellent in the landing position accuracy when landing the light absorbing material over the attaching target apart by at least 0.5 mm or greater.

Moreover, it is preferable that the gap be maintained constant by, for example, a position controlling unit configured to maintain the attaching target at a constant position.

In this case, what matters is to dispose each component considering position fluctuation and average thickness variation of the light absorbing material and the attaching target.

The average diameter (average dot diameter) of the light absorbing material over the transfer medium (attaching target) after transferred (attached) there is not particularly limited, may be appropriately selected depending on the intended purpose, and is preferably 100 micrometers or less because the resolution of an image or a three-dimensional object to be formed is better improved. In the present disclosure, a flying liquid droplet flies with a diameter smaller than the diameter of the laser beam with which the liquid droplet is irradiated, but the diameter of the dot to be formed changes depending on the relationship between the impact when the liquid droplet lands on the transfer medium and the surface tension of the surface of the transfer medium.

The average dot diameter can be obtained by, for example, capturing images of dots of the light absorbing material with, for example, a microscope, detecting dot regions from the image luminance information, calculating the area of each dot based on the number of pixels in each dot region detected, converting the dot regions to circular shapes to obtain the diameters of the circular shapes as dot diameters, and averaging the dot diameters.

The variation of the diameter (dot diameter) of the light absorbing material over the transfer medium (attaching target) after transferred (attached) there is preferably 10% or lower, and more preferably 6% or lower. When the variation of the diameter of the light absorbing material over the transfer medium after transferred is in the preferable range described above, the accuracy of forming an image or a three-dimensional object can be better improved.

The variation of the diameter of the light absorbing material over the transfer medium after transferred can be obtained by, for example, capturing images of dots of the light absorbing material with, for example, a microscope, detecting dot regions from the image luminance information, calculating the area of each dot based on the number of pixels in each dot region detected, converting the dot regions to circular shapes to obtain the diameters of the circular shapes as dot diameters, and calculating the variation based on the average particle diameter and standard deviation of the particle diameter distribution of the dots.

The variation of the position (dot position) of the light absorbing material over the transfer medium (attaching target) after transferred (attached) there is preferably 10 micrometers or less and more preferably 5 micrometers or less. When the variation of the position of the light absorbing material over the transfer medium after transferred is in the preferable range described above, the accuracy of forming an image or a three-dimensional object can be better improved. The variation of the position of the light absorbing material over the transfer medium after transferred may be, for example, variation of the position of the light absorbing material in a direction orthogonal to a line of dots formed when dots of the light absorbing material are attached in a line.

The variation of the position of the light absorbing material over the transfer medium after transferred can be obtained by, for example, capturing images of dots of the light absorbing material with, for example, a microscope, detecting dot regions from the image luminance information, calculating the coordinates of the center of gravity of each dot region detected, and calculating the gap of each center of gravity from an approximate straight line obtained by the least-squares method of the centers of gravity.

The light absorbing material flying unit, the light absorbing material feeding unit, and the beam scanning unit may be handled integrally as a colorant flying unit.

For example, four colorant flying units may be provided in the image forming apparatus to fly colorants of yellow, magenta, cyan, and black colors, which are the process colors. The number of colors of the colorants is not particularly limited and may be appropriately selected depending on the intended purpose. As needed, the number of colorant flying units may be increased or decreased. A colorant flying unit including a white colorant can for a white hiding layer, if provided upstream of the colorant flying units including the process color colorants in the conveying direction of a recording medium. This makes it possible to form an image excellent in color reproducibility over a transparent recording medium. However, in some cases, there is a need for appropriately selecting laser light sources from among, for example, blue laser beams and ultraviolet laser beams in a manner that the light transmittance (absorbance) of particularly yellow, white, and transparent colorants with respect to laser beam wavelengths may be appropriate.

The image forming apparatus can use colorants having a high viscosity. Therefore, when forming an image by overlaying colorants of different colors sequentially over a recording medium, the image forming apparatus can suppress occurrence of bleeding, which is mixing between bleeding colorants, and can hence form a color image having a high image quality.

With a view to, for example, reducing the size of the image forming apparatus, it is optional to provide only one colorant flying unit in the image forming apparatus and form an image formed of a plurality of colors by switching between feeding rollers and colorants to be fed to the colorant bearing member.

It is optional to apply the image forming apparatus of the present disclosure to a three-dimensional object producing apparatus as below.

(Three-Dimensional Object Producing Method and Three-Dimensional Object Producing Apparatus)

A three-dimensional object producing method of the present disclosure includes a light absorbing material flying step of irradiating a surface of a base material opposite to a surface over which a light absorbing material is disposed with a laser beam to fly the light absorbing material in an emitting direction of the laser beam, a transferring step of transferring the light absorbing material flown, to a transfer medium, and a curing step of curing the light absorbing material transferred. The three-dimensional object producing method repeats transferring the light absorbing material to the light absorbing material cured and curing the light absorbing material, and generates a vaporized region having a pressure higher than or equal to an outside pressure at an interface between the base material and the light absorbing material along an outer circumference of a region irradiated with the laser beam. The three-dimensional object producing method further includes other steps as needed.

A three-dimensional object producing apparatus of the present disclosure includes a light absorbing material flying unit configured to irradiate a surface of a base material opposite to a surface over which a light absorbing material is disposed with a laser beam to fly the light absorbing material in an emitting direction of the laser beam, a transferring unit configured to transfer the light absorbing material flown, to a transfer medium, and a curing unit configured to cure the light absorbing material transferred. The three-dimensional object producing apparatus repeats transferring the light absorbing material to the light absorbing material cured and curing the light absorbing material, and generates a vaporized region having a pressure higher than or equal to an outside pressure at an interface between the base material and the light absorbing material along an outer circumference of a region irradiated with the laser beam. The three-dimensional object producing apparatus further includes other units as needed.

The three-dimensional object producing method and the three-dimensional object producing apparatus of the present disclosure are the same as the image forming method and the image forming apparatus of the present disclosure except including the curing step and the curing unit, and repeating transferring the light absorbing material to the light absorbing material cured and curing the light absorbing material. Therefore, description of the three-dimensional object producing method and the three-dimensional object producing apparatus will be skipped except the differences.

<Curing Step and Curing Unit>

The curing step is a step of curing the light absorbing material transferred.

The curing unit is a unit configured to cure the light absorbing material transferred.

The curing unit is not particularly limited and may be appropriately selected depending on the intended purpose. Examples of the curing unit include an ultraviolet irradiator when the light absorbing material is an ultraviolet-ray-curable material.

The three-dimensional object producing method and the three-dimensional object producing apparatus of the present disclosure can produce a three-dimensional object by repeating transferring the light absorbing material to the light absorbing material cured and curing the light absorbing material.

<Other Steps and Other Units>

Examples of the other steps include a light absorbing material feeding step, a three-dimensional object producing head unit scanning step, a substrate position adjusting step, and a controlling step.

Examples of the other units include a light absorbing material feeding unit, a three-dimensional object producing head unit scanning unit, a substrate position adjusting unit, and a controlling unit.

<<Light Absorbing Material Feeding Unit>>

The light absorbing material feeding unit is the same as the light absorbing material feeding unit described above except that the light absorbing material is a three-dimensional object forming agent and the attaching target is an object support substrate. Therefore, description of the light absorbing material feeding unit will be skipped.

<<Three-Dimensional Object Producing Head Unit Scanning Unit>>

The three-dimensional object producing head unit scanning unit is not particularly limited and may be appropriately selected depending on the intended purpose. For example, the three-dimensional object producing head unit scanning unit may scan a three-dimensional object producing head unit in which a light absorbing material flying unit and a curing unit are integrated, over the object support substrate in a width direction (X axis direction) of the apparatus. For example, the three-dimensional object producing head unit may be configured to cause the curing unit to cure an ultraviolet-ray-curable light absorbing material applied by the light absorbing material flying unit. It is optional to provide a plurality of three-dimensional object producing head units.

<<Substrate Position Adjusting Unit>>

The substrate position adjusting unit is not particularly limited and may be appropriately selected depending on the intended purpose. The substrate position adjusting unit may be, for example, a base (stage) that can adjust the position of the object support substrate in the depth direction (Y axis direction) and the height direction (Z axis direction) of the apparatus.

<<Controlling Unit>>

The controlling unit is the same as the controlling unit of the image forming apparatus described above. Therefore, description of the controlling unit will be skipped.

The three-dimensional object forming agent contains at least a curable material and further contains other components as needed.

<<Curable Material>>

The curable material is not particularly limited and may be appropriately selected depending on the intended purpose so long as the curable material is a compound that undergoes a polymerization reaction and cures in response to, for example, irradiation with active energy rays (e.g., ultraviolet rays and electron beams) and heating. Examples of the curable material include active-energy-ray-curable compounds, and thermosetting compounds. Among these materials, a material that is liquid at normal temperature is preferable.

The active-energy-ray-curable compound is a monomer containing a radical-polymerizable unsaturated double bond in a molecular structure thereof and having a relatively low viscosity. Examples of the active-energy-ray-curable compound include monofunctional monomers and multifunctional monomers.

<<Other Components>>

The other components are not particularly limited and may be appropriately selected depending on the intended purpose. Examples of the other components include water, an organic solvent, a photopolymerization initiator, a surfactant, a colorant, a stabilizer, a water-soluble resin, a low-boiling-point alcohol, a surface treating agent, a viscosity modifier, a tackifier, an antioxidant, an age resistor, a cross-linking accelerator, an ultraviolet absorbent, a plasticizer, a preservative, and a dispersant.

—Object Support Substrate—

The object support substrate is not particularly limited and may be appropriately selected depending on the intended purpose. The substrate position adjusting unit may adjust the position of the object support substrate in the Y axis direction and the Z axis direction.

The gap between the object support substrate and the base material is the same as the gap between the attaching target and the base material. Therefore, description of the gap between the object support substrate and the base material will be skipped.

Next, an example of the three-dimensional object producing apparatus of the present disclosure will be described with reference to the drawings.

For example, the number, position, and shape of the constituent components described below are not limited to the present embodiment, and may be any number, position, shape that are suitable for working the present disclosure.

Figure 14:
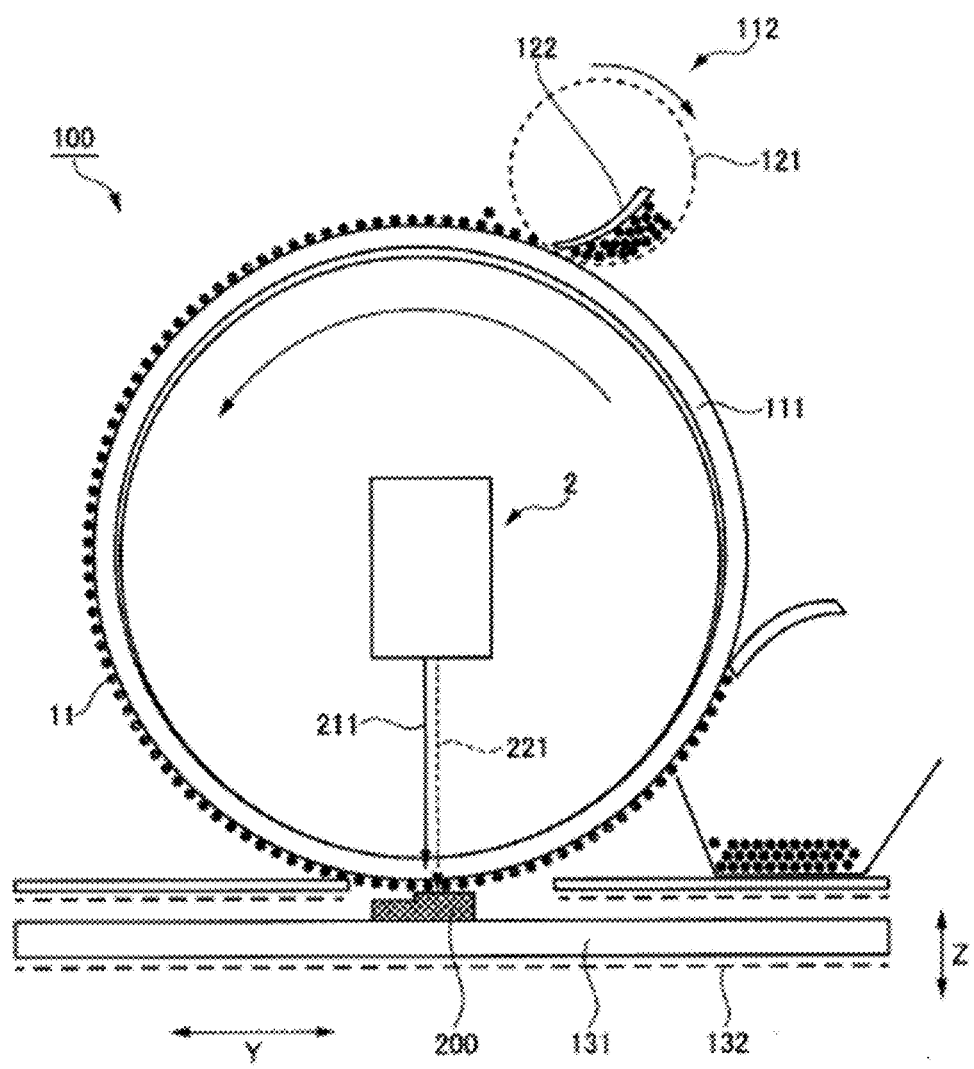
FIG. 14 is an exemplary view illustrating an example of a three-dimensional object producing apparatus of the present disclosure.

The three-dimensional object producing apparatus 100 will be described with reference to FIG. 14. FIG. 14 is a diagram illustrating an example of the configuration of the three-dimensional object producing apparatus 100.

The three-dimensional object producing apparatus 100 includes a stage 131, which is a supporting member configured to support an object to be produced (an object yet to be completed) 200. The stage 131 is reciprocably movable in the direction of the arrow Y, and is vertically movable in the direction of the arrow Z at a pitch of, for example, 0.05 mm, which is the object formation thickness.

A stage heater 132 is disposed underneath the stage 131, and the stage 131 is controlled to a temperature suited to the light absorbing material 11 serving as an object forming material.

A bearing member 111 formed of a rotating member configured to bear the light absorbing material 11 having a particle form is disposed above the stage 131. The bearing member 111 is formed of a rotating drum that rotates in the direction of the arrow (conveying direction) while bearing the light absorbing material 11, and is configured to convey the light absorbing material 11 to above an object 20 over the stage 131. The bearing member 111 is a transparent member and is formed of a cylindrical glass member. However, this is non-limiting.

The light absorbing material 11 needs to be appropriately selected depending on an intended object 200. Examples of the light absorbing material 11 when it is a resin include PA12 (polyamide 12), PBT (polybutylene terephthalate), PSU (polysulfone), PA66 (polyamide 66), PET (polyethylene terephthalate), LCP (liquid crystal polymer), PEEK (polyether ether ketone), POM (polyacetal), PSF (polysulfone), PA6 (polyamide 6), and PPS (polyphenylene sulfide). The light absorbing material 11 of the present embodiment is not limited to crystalline resins, but may also be, for example, PC (polycarbonate), ABS (acrylonitrile-butadiene-styrene), and PEI (polyether imide), which are amorphous resins, and mixture resins of crystalline and amorphous resins.

The light absorbing material 11 may be formed of various materials such as metals, ceramics, and liquids, in addition to resins. The light absorbing material 11 may be a material having a viscosity of 1 Pa·s or higher.

In the present embodiment, the bearing member 111 bears the light absorbing material 11 over a circumferential surface thereof by an intermolecular force (Van der Waals force). When the light absorbing material 11 has a high resistance value, the bearing member 111 can bear the light absorbing material only by an electrostatic attracting force.

A light absorbing material feeding unit 112 configured to feed the light absorbing material 11 over the circumferential surface (surface) of the bearing member 111 is disposed around the bearing member 111.

The light absorbing material feeding unit 112 includes a mesh roller 121 internally loaded with the light absorbing material 11 and configured to rotate in the direction of the arrow, and a blade 122 configured to slide over the light absorbing material 11 and rub the light absorbing material 11 in the mesh roller 121. The light absorbing material feeding unit 112 causes the blade 122 to slide over and rub the light absorbing material 11 to loosen aggregation of the light absorbing material 11 and pass the light absorbing material 11 through the mesh roller 121, to form a thin film (layer) of the light absorbing material 11 over the circumferential surface of the bearing member 111.

The mesh size of the mesh of the mesh roller 121 is preferably greater than the average particle diameter of the light absorbing material 11 by from 20% through 30%. A mesh formed of woven metallic wires can be used as the mesh roller 121, but a flat mesh produced by, for example, electroforming is more preferable.

Feeding by the light absorbing material feeding unit 112 is not limited to by a mesh roller. It is optional to employ, for example, contact feeding by a rotating member, contactless feeding, contactless sprinkling from above a mesh, and fluidized bed coating by powder air flow stirring.

A light irradiator 2 serving as a unit configured to fly the light absorbing material 11 from the circumferential surface of the bearing member 111 is disposed inside the bearing member 111.

The light irradiator 2 has the same configuration as any of the embodiments described above, and is configured to irradiate the light absorbing material 11 with a pulsed laser beam 211 for flying and a laser beam 221 for fixing from inside the bearing member 111. The position at which the light absorbing material 11 is irradiated with the laser beam 221 for fixing corresponds to the position at which an object is produced.

Being irradiated with the laser beam 211 for flying, the light absorbing material 11 flies from the circumferential surface of the bearing member 111 in the emitting direction of the laser beam 211 for flying.

The light absorbing material 11 landed over the object 200 is heated and melted by irradiation with the laser beam 221 for fixing, and then cools and integrates with the object 200. In this way, the object 200 grows by at least one light absorbing material.

In this way, the operation of flying the light absorbing material 11 by the laser beam 211 for flying while conveying the light absorbing material 11 by continuous rotation of the bearing member 111 and the operation of heating and melting the landed light absorbing material 11 by the laser beam 221 for fixing to fix the light absorbing material 11 on the surface of the object 200 are repeated until object production is completed.

In this way, it is possible to grow the object 200 to a shape needed, and produce a three-dimensional object.

In the present embodiment, a fixing method example of melting the light absorbing material 11 landed over the object 200 by irradiation with the laser beam 221 for fixing has been illustrated. This is non-limiting. The present embodiment can also be applied to a method of landing the light absorbing material 11 flown by irradiation with the laser beam 211 for flying over the surface of the object 200 previously melted by irradiation with the laser beam 221 for fixing, and subsequently fixing the light absorbing material 11 through cooling of the surface of the object 200. It is possible to carry out this method by delaying the irradiation timing of the laser beam 211 for flying from the irradiation timing of the laser beam 221 for fixing.

Examples of the embodiments of the present disclosure have been described above. However, the present disclosure are not limited to these specific embodiments, but various modifications and alterations may be made within the scope of the essentials of the present disclosure defined in the claims.

EXAMPLES

The present disclosure will be described below by way of Examples. However, the present disclosure should not be construed as being limited to these Examples.

In the following description, Examples and Comparative Examples in which an image forming apparatus including the light absorbing material flying unit illustrated in FIG. 12B was used to irradiate a magenta ink serving as a light absorbing material with a pulse-oscillated laser beam to form a dot over an attaching target will be described.

Example 1

<Substrate, Light Absorbing Material, and Attaching Target>

A UV ink having the formulation described below serving as a light absorbing material was applied over a surface of a slide glass (obtained from Matsunami Glass Ind., Ltd., MICRO-SLIDE GLASS S7213, with a transmittance of 99% with respect to a light wavelength of 532 nm) serving as a base material, to form a film having an average thickness of 20 micrometers. Here, the transmittance of the film-shaped light absorbing material with respect to the light wavelength of 532 nm was 0.01% or lower (i.e., an absorbance of 4 or higher). The viscosity of the UV ink measured with, for example, a rotary viscometer (VISCOMATE VM-150III, obtained from Toki Sangyo Co., Ltd.) in an environment at 25 degrees C. was 4 Pa·s.

UV CORE TYPE-A CRIMSON (obtained from T&K TOKA Corporation) 100 parts by mass
UV FLEXO 500 CRIMSON (obtained from T&K TOKA Corporation) 50 parts by mass Next, the base material was set in a manner that the surface of the base material coated with the light absorbing material would face an attaching target (transfer medium) and the light absorbing material could be irradiated with a laser beam orthogonally from the back of the light absorbing material.

POD GLOSS COAT PAPER (obtained from Mitsubishi Paper Mills Limited) was used as the attaching target (transfer medium), and the gap between the attaching target (transfer medium) and the light absorbing material was set to 0.5 mm.

A laser emitted using the light absorbing material flying unit illustrated in FIG. 12B is as follows.

The light absorbing material flying unit includes, for example, a laser light source, a beam shaping unit, and a beam transforming unit.

The light absorbing material flying unit of the flying body generating apparatus illustrated in FIG. 12B includes a scanning optical system mounted with a galvano scanner.

First, a laser emitted by a Nd:YAG laser light source unit having a wavelength of 1,064 nm was passed through a spatial isolator, a λ/4 plate, and a collimating lens. An acoustooptic modulator (AOM) time-divided the laser to 0-order light and primary light based on an ON/OFF signal from a PC and a controller. In this way, the frequency of the laser light source was controlled. The 0-order light was cut when passing through mirrors and lenses, and only the primary light passed a nonlinear optical crystal (SHG element). As a result, under nonlinear optical effects, a second harmonic (SHG) was generated, and green light having a wavelength of 532 nm was generated. A harmonic separator HS obtained a beam having a single color of green by separating a fundamental harmonic and a second harmonic from each other. The phase distribution and the intensity distribution of the obtained green light were corrected by aberration correction or by an aspect ratio magnification variation element, and then the green light passed a zoom lens and came incident to a beam transforming element configured to transform the light to an annular beam.

Subsequently, the annular beam passed mirrors, ND, and other optical elements, was reflected by an optical deflector such as a galvano mirror, so that the surface or the interior of the sample (light absorbing material, magenta ink) was irradiated with the beam through a condenser lens.

<Evaluation of Attaching Condition>

Figure 15A:
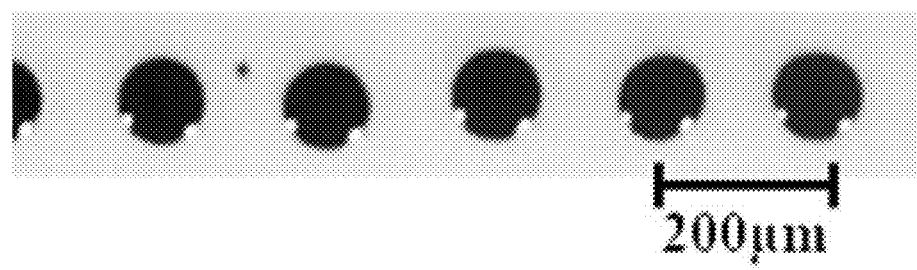
FIG. 15A is an image illustrating an example of a result in Example 1.

FIG. 15A illustrates the attaching condition over the attaching target over which the light absorbing material flown was attached.

Example 1 optimized the internal diameter of the beam by superimposing the conical wavefront of the present disclosure.

Figure 15B:
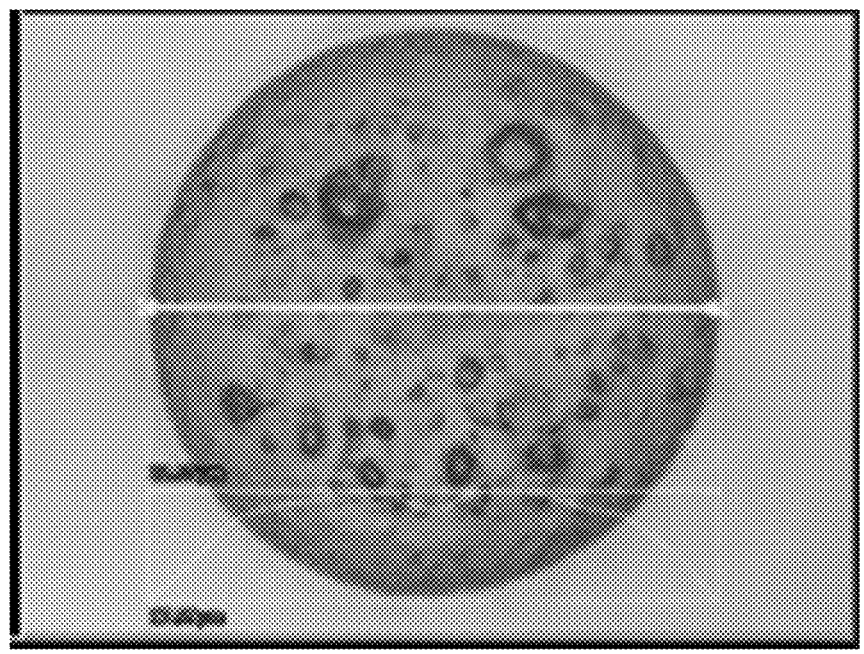
FIG. 15B is an image illustrating another example of a result in Example 1.
Figure 15C:
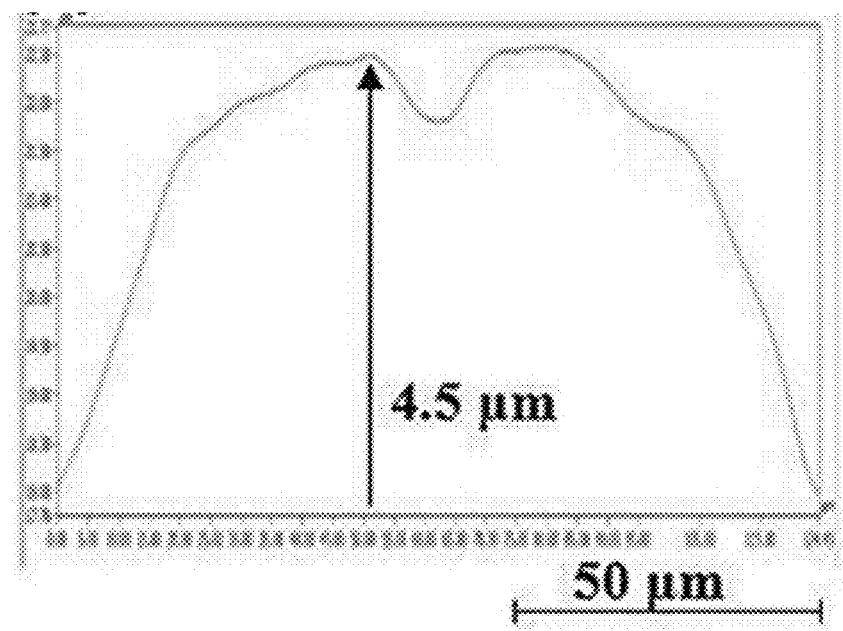
FIG. 15C is a graph plotting another example of a result in Example 1.

FIG. 15B illustrates an enlarged view of a landed liquid droplet illustrated in FIG. 15A. FIG. 15C plots the cross-sectional profile of the landed liquid droplet.

As illustrated in FIG. 15A, it turned out that the landed liquid droplets formed almost perfect circles. As illustrated and plotted in FIG. 15B and FIG. 15C, the landed liquid droplet was an approximately true circle, and it turned out also from the cross-sectional profile that the landed liquid droplet had a good symmetricity.

It was found that liquid droplets having a high shape reproducibility were formed when the present disclosure was used. In terms of liquid droplet diameter, good results were obtained, with an accuracy of 3% or lower. This accuracy is comparable to the dot reproducibility accuracy of electrophotography. This suggests that the method of the present disclosure may be able to print images with a high quality comparable to electrophotography.

Moreover, no scattering was observed, and a very high landing position accuracy was exhibited.

Comparative Example 1

A light absorbing material was flown in the same manner as in Example 1, except that unlike in Example 1, no beam shaping unit and beam transforming unit were used, but a Gaussian laser beam having a beam diameter of 33 micrometers was used.

<Evaluation of Attaching Condition>

Figure 16:
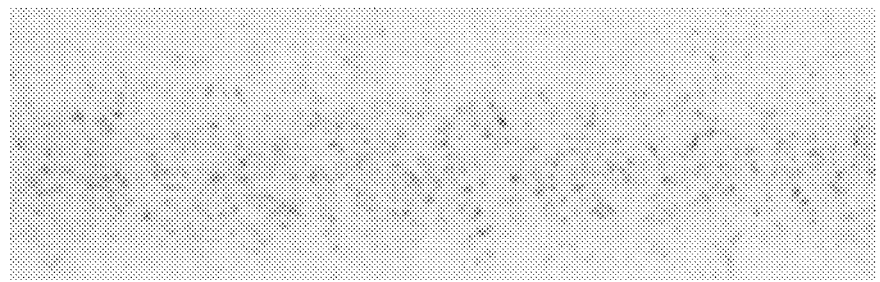
FIG. 16 is an image illustrating an example of a result in Comparative Example 1.

FIG. 16 illustrates the attaching condition over the attaching target over which the light absorbing material flown was attached.

As illustrated in FIG. 16, the light absorbing material attached was dispersed over the attaching target, and nothing that could be regarded as a solid shape was observed.

Comparative Example 2

A light absorbing material was flown in the same manner as in Example 1, except that unlike in Example 1, the light absorbing material flying unit was changed as below.

<Light Absorbing Material Flying Unit>

The light absorbing material flying unit adjusted an optical vortex laser, which was a Laguerre-Gaussian beam, using a laser light source (the same as in Example 1), a beam diameter changing member, a beam wavelength changing element, and a spiral phase plate serving as an optical vortex transforming unit, and irradiated a sample with the optical vortex laser adjusted.

<Evaluation of Attaching Condition>

Figure 17:
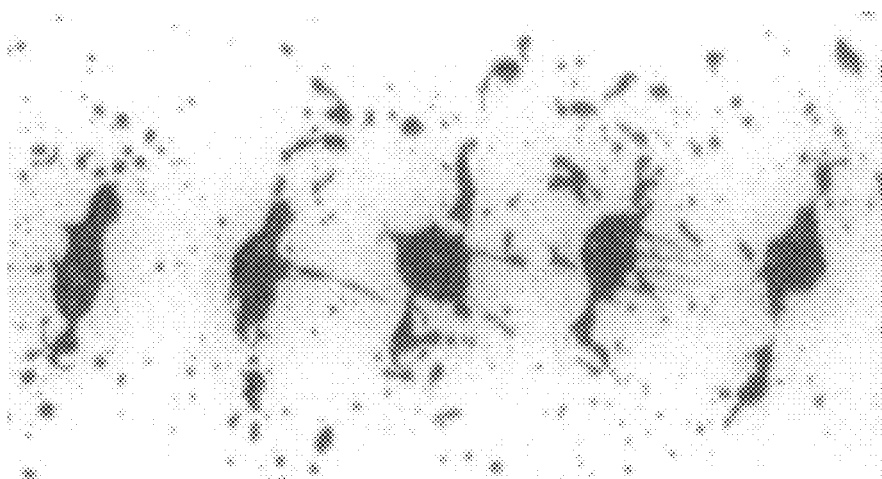
FIG. 17 is an image illustrating an example of a result in Comparative Example 2.

FIG. 17 illustrates the attaching condition over the attaching target over which the light absorbing material flown was attached.

Comparative Example 2 presents the result obtained when an optical vortex laser, which was a Laguerre-Gaussian beam with the index L=1, was used. Comparative Example 2 obtained a better landing position accuracy as compared with a Gaussian beam because there was clear presence of liquid droplets, but obtained a poorer landing position accuracy as compared with Example 1 because scattering was observed. This was because the ring diameter did not match the conditions of the light absorbing material, so liquid droplets flown while breaking apart. It was possible to change the diameter by changing the Laguerre-Gaussian beam index L. However, because the Laguerre-Gaussian beam index L could take only integers, it was difficult to match the Laguerre-Gaussian beam index L to an optimum value.

Example 2

The gap between the attaching target and the light absorbing material in Example 1 was changed to 0.2 mm, 0.5 mm, 0.7 mm, 1.0 mm, 2.0 mm.

<Evaluation of Attaching Condition>

Figure 18A:
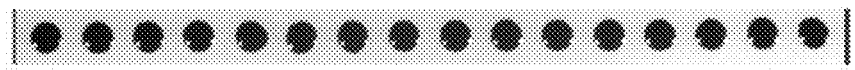
FIG. 18A is an image illustrating an example of a result in Example 2.
Figure 18A:
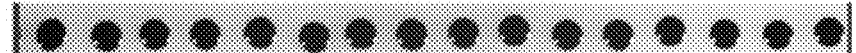
Figure 18A:
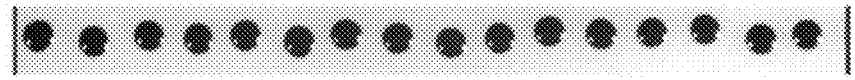
Figure 18A:

FIG. 18A illustrates the attaching condition over the attaching target over which the light absorbing material flown was attached.

The experiment was conducted with enlargement of the gap between the donor and the receiver to 2.0 mm. FIG. 18A illustrates the results of measurement of the relationship between the gaps of from 0.2 mm through 2.0 mm and the average liquid droplet diameter. It was revealed that the average liquid droplet diameter was not dependent on the gaps of from 0.2 mm through 2.0 mm. As illustrated in FIG. 18A, the image forming method of the present disclosure resulted in almost no difference in the appearance of the liquid droplets even when the gap between the attaching target and the light absorbing material was set large (1.0 mm).

Figure 18B:
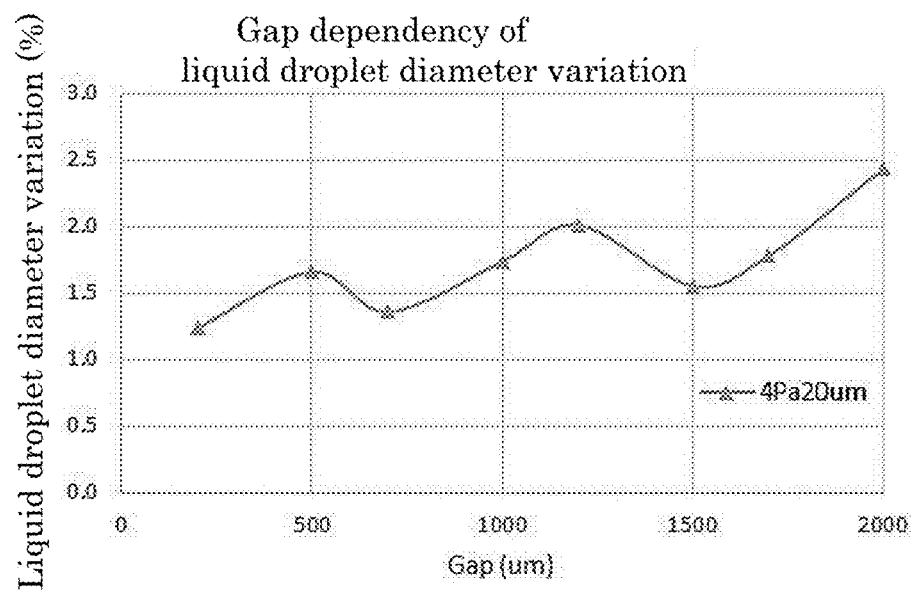
FIG. 18B is a graph plotting an example of a result in Example 2.

FIG. 18B plots the relationship between the liquid droplet diameter variation and the gap between the attaching target and the light absorbing material. It was revealed that not only in the appearance, but also in the liquid droplet diameter, the variation was considerably low and 2.5% at the maximum even when the gap between the attaching target and the light absorbing material was enlarged to 2.0 mm, although the variation had a slight increasing tendency from 1.2% to 2.4% when the gap was increased by ten times from 0.2 mm to 2.0 mm, as plotted in FIG. 18B.

Referential Example

The result of an experiment in which a QR code (registered trademark) was printed will be described as an application example. The donor conditions were a viscosity of 3 Pa·s and a film thickness of 9 micrometers. The experiment conditions were a scanning speed V of 200 mm/seconds, a gap of 0.5 mm, and an overlap speed (=1−interval/diameter) of 0.09.

Figure 19:
FIG. 19 is an image illustrating an example of a result in a referential example.

The QR code (registered trademark) (10 mm vertically and 10 mm horizontally) illustrated in FIG. 19 was produced under the light absorbing material flying conditions of Example 1.

Using the image forming method of the present disclosure, it was possible to form not only dots, but also line and pattern images.

From the results described above, microscopic observation revealed that the flying bodies (landing liquid droplets) formed almost perfect circles at a gap of 0.5 mm. The liquid droplet diameter was not dependent on the irradiation energy, but was dependent on the ring diameter. It was also revealed that liquid droplets with a high reproducibility were formed. As a result of an analysis, a good result was obtained with a dot size accuracy of 3% or lower. This accuracy was comparable to the dot accuracy of electrophotography. Moreover, it was revealed that the average liquid droplet size and the liquid droplet size accuracy were not dependent on the gap in the range of from 0.2 mm through 2.0 mm. It was confirmed that the printed QR code (registered trademark) was successfully read by a commercially available smart phone. This result is a strong evidence presenting that BR-LIFT can provide various applications.

As described above, the experiment was conducted in the range of the gap of from 0.2 mm through 2.0 mm between the donor and the receiver, and landing liquid droplets were microscopically observed to confirm that the liquid droplets formed almost perfect circles. The proposed system opens the door to development of flexible QR code (registered trademark) printing.

Aspects of the present disclosure are, for example, as follows.

<A1> A light irradiation method for irradiating a light absorbing material for absorbing light with a light beam having a wavelength absorbable by the light absorbing material, the light irradiation method including
  applying to the light absorbing material, energy that enables the light absorbing material to fly, by a pressure in a vaporized region higher than or equal to an outside pressure, where the vaporized region is present at an interface between a transparent body and the light absorbing material in a manner that the vaporized region surrounds an optical axis.

<A2> The light irradiation method according to <A1>, further including
  making a liquid droplet amount of the light absorbing material small by addition of a surface conditioner to the light absorbing material to reduce a surface tension of the light absorbing material and make the light absorbing material fly and land on an attaching target in a form of a liquid droplet in a suitable amount.

<A3> The light irradiation method according to <A1> or <A2>, further including
  irradiating the light absorbing material on the optical axis with energy lower than an energy density that causes the light absorbing material to vaporize,
  wherein no vaporized region is present on the optical axis.

<A4> The light irradiation method according to any one of <A1> to <A3>,
  wherein an inner diameter of a beam profile surrounding the optical axis in a wavefront of the light beam is 20 micrometers or greater but 90 micrometers or less.

<A5> The light irradiation method according to any one of <A1> to <A4>, further including
  using the light absorbing material, of which viscosity lowers by irradiation with light, to induce a vaporizing pressure toward the optical axis.

<A6> The light irradiation method according to any one of <A1> to <A5>, further including
  irradiating the light absorbing material with energy that makes a fluence at a back side, which is a side opposite to a side irradiated with light, lower than an energy density that causes the light absorbing material to vaporize.

<A7> A light absorbing material attaching apparatus including:
  a light absorbing material for absorbing light;
  a unit configured to irradiate the light absorbing material with a light beam having a wavelength absorbable by the light absorbing material; and
  a unit configured to convert a phase distribution of an incident laser beam wavefront for conversion to a desired beam profile,
  wherein a vaporized region having a pressure higher than or equal to an outside pressure is present at an interface between a transparent body and the light absorbing material in a manner that the vaporized region surrounds an optical axis, and wherein the light absorbing material attaching apparatus applies to the light absorbing material, energy that enables the light absorbing material to fly, by the pressure of the vaporized region, to land the light absorbing material on an attaching target apart by at least 0.5 mm or greater.

<A8> The light absorbing material attaching apparatus according to <A7>, further including a film thickness controlling unit configured to control a resolution, wherein the film thickness controlling unit serves as a unit configured to feed the light absorbing material.

<A9> The light absorbing material attaching apparatus according to <A7> or <A8>, further including a unit configured to superimpose a conical wavefront on a wavefront of the light beam to change an inner diameter of the light beam having an annular shape surrounding the optical axis.

<B1> A flying body generating method including irradiating a surface of a base material opposite to a surface over which a light absorbing material is disposed with a laser to fly the light absorbing material in an emitting direction of the laser beam, wherein a vaporized region having a pressure higher than or equal to an outside pressure is generated along an outer circumference of a region irradiated with the laser beam at an interface between the base material and the light absorbing material.

<B2> The flying body generating method according to <B1>, wherein a laser intensity of the laser beam on an optical axis of the laser beam is lower than a laser intensity of the laser beam in the outer circumference.

<B3> The flying body generating method according to <B1> or <B2>, wherein a laser intensity in the outer circumference is higher than a laser intensity on an optical axis.

<B4> The flying body generating method according to any one of <B1> to <B3>, wherein the laser beam is an annular laser beam.

<B5> The flying body generating method according to <B4>, wherein an inner diameter of the annular laser beam is 20 micrometers or greater but 90 micrometers or less.

<B6> The flying body generating method according to any one of <B1> to <B5>, wherein a fluence (J/cm$^2$) of the laser beam at an externally exposed surface of the light absorbing material opposite to a surface contacting the base material is obtained by irradiation with the laser beam having an energy density lower than an energy density that generates the vaporized region.

<B7> The flying body generating method according to any one of <B1> to <B6>, wherein the light absorbing material contains a surface tension regulator.

<B8> The flying body generating method according to any one of <B1> to <B7>, wherein the light absorbing material is a material of which viscosity lowers when irradiated with the laser beam.

<B9> A flying body generating apparatus including a light absorbing material flying unit configured to irradiate a surface of a base material opposite to a surface over which a light absorbing material is disposed with a laser beam to fly the light absorbing material in an emitting direction of the laser beam, wherein a vaporized region having a pressure higher than or equal to an outside pressure is generated along an outer circumference of a region irradiated with the laser beam at an interface between the base material and the light absorbing material.

<B10> The flying body generating apparatus according to <B9>, further including a phase converting unit configured to convert a phase distribution of the laser beam.

<B11> The flying body generating apparatus according to <B9> or <B10>, further including an annular laser beam transforming unit configured to transform the laser beam into an annular laser beam.

<B12> The flying body generating apparatus according to any one of <B9> to <B11>, further including a film thickness controlling unit configured to control a film thickness of the light absorbing material disposed over the surface of the base material.

<B13> An image forming method including:

irradiating a surface of a base material opposite to a surface over which a light absorbing material is disposed with a laser beam to fly the light absorbing material in an emitting direction of the laser beam; and transferring the light absorbing material flown, to a transfer medium, wherein a vaporized region having a pressure higher than or equal to an outside pressure is generated along an outer circumference of a region irradiated with the laser beam at an interface between the base material and the light absorbing material.

<B14> An image forming apparatus including:

a light absorbing material flying unit configured to irradiate a surface of a base material opposite to a surface over which a light absorbing material is disposed with a laser beam to fly the light absorbing material in an emitting direction of the laser beam; and a transferring unit configured to transfer the light absorbing material flown, to a transfer medium, wherein a vaporized region having a pressure higher than or equal to an outside pressure is generated along an outer circumference of a region irradiated with the laser beam at an interface between the base material and the light absorbing material.

<B15> A three-dimensional object producing method including:

irradiating a surface of a base material opposite to a surface over which a light absorbing material is disposed with a laser beam to fly the light absorbing material in an emitting direction of the laser beam;

transferring the light absorbing material flown, to a transfer medium; and curing the light absorbing material transferred, wherein the three-dimensional object producing method repeats transferring the light absorbing material to the light absorbing material cured, and curing the light absorbing material, and wherein a vaporized region having a pressure higher than or equal to an outside pressure is generated along an outer circumference of a region irradiated with the laser beam at an interface between the base material and the light absorbing material.

<B16> A three-dimensional object producing apparatus including:

a light absorbing material flying unit configured to irradiate a surface of a base material opposite to a surface over which a light absorbing material is disposed with a laser beam to fly the light absorbing material in an emitting direction of the laser beam;

a transferring unit configured to transfer the light absorbing material flown, to a transfer medium; and a curing unit configured to cure the light absorbing material transferred, wherein the three-dimensional object producing apparatus repeats transferring the light absorbing material to the light absorbing material cured, and curing the light absorbing material, and wherein a vaporized region having a pressure higher than or equal to an outside pressure is generated along an outer circumference of a region irradiated with the laser beam at an interface between the base material and the light absorbing material.

The light irradiation method according to any one of <A1> to <A6>, the ight absorbing material attaching apparatus according to any one of <A7> to <A9>, the flying body generating method according to any one of <B1> to <B8>, the flying body generating apparatus according to any one of <B9> to <B12>, the image forming method according to <B13>, the image forming apparatus according to <B14>, the three-dimensional object producing method according to <B15>, and the three-dimensional object producing apparatus according to <B16> can solve the various problems in the related art and achieve the object of the present disclosure.

What is claimed is:

1. A light irradiation method for irradiating a light absorbing material for absorbing light with a light beam having a wavelength absorbable by the light absorbing material, the light irradiation method comprising:

correcting astigmatism of the light beam by a phase distribution converter;

transforming the light beam after correcting the astigmatism into an annular light beam; and applying to the light absorbing material, energy that enables the light absorbing material to fly, by a pressure toward an optical axis of the annular light beam, the pressure being produced by the annular light beam in a vaporized region that is present along an outer circumference of the optical axis of the annular light beam and at an interface between a transparent body and the light absorbing material when the light absorbing material is irradiated with the annular light beam of which laser intensity is lower on the optical axis than in the outer circumference of the optical axis, the pressure produced by the annular light beam in the vaporized region being higher than or equal to an outside pressure, where the vaporized region is present at the interface between the transparent body and the light absorbing material in a manner that the vaporized region surrounds the optical axis, wherein a maximum length of the vaporized region in a film thickness direction of the light absorbing material is less than or equal to one half of a film thickness of the light absorbing material.

2. The light irradiation method according to claim 1, further comprising adding a surface conditioner to the light absorbing material to reduce a surface tension of the light absorbing material and make the light absorbing material fly and land on an attaching target in a form of a liquid droplet.

3. The light irradiation method according to claim 1, further comprising irradiating the light absorbing material on the optical axis with energy lower than an energy density that causes the light absorbing material to vaporize while lowering viscosity of the light absorbing material on the optical axis, wherein no vaporized region is present on the optical axis.

4. The light irradiation method according to claim 1, wherein an inner diameter of a beam profile surrounding the optical axis of the annular light beam is 20 micrometers or greater but 90 micrometers or less.

5. The light irradiation method according to claim 1, further comprising using the light absorbing material, of which viscosity lowers by irradiation with light, to induce a vaporizing pressure toward the optical axis.

6. The light irradiation method according to claim 1, further comprising irradiating the light absorbing material with energy that makes a fluence at a back side of the light absorbing material opposite to a side irradiated with light, lower than an energy density that causes the light absorbing material to vaporize.

7. The light irradiation method according to claim 1, wherein the energy, Q, satisfies formula (1) below:

$$Q \geq Tb(v \cdot c \cdot \rho) \quad \text{Formula (1)}$$

wherein v represents volume in a unit of kg, c represents specific heat in a unit of J/(kg·K), and ρ represents density in a unit of kg/m³, and Tb represents a risen temperature at which a light absorbing material in a room temperature environment starts to vaporize in a unit of K.

8. A flying body generating method comprising:

correcting astigmatism of a laser beam by a phase distribution converter;

transforming the laser beam after correcting the astigmatism into an annular laser beam; and irradiating a surface of a base material opposite to a surface over which a light absorbing material is disposed with the annular laser beam to fly the light absorbing material in an emitting direction of the annular laser beam by a pressure toward an optical axis of the annular laser beam, the pressure being produced by the annular laser beam in a vaporized region that is present along an outer circumference of the optical axis of the annular laser beam and at an interface between a transparent body and the light absorbing material when the light absorbing material is irradiated with the annular laser beam of which laser intensity is lower on the optical axis than in the outer circumference of the optical axis, the pressure produced by the annular laser beam in the vaporized region being higher than or equal to an outside pressure, wherein a maximum length of the vaporized region in a film thickness direction of the light absorbing material is less than or equal to one half of a film thickness of the light absorbing material.

9. An image forming method comprising:

flying the light absorbing material in the emitting direction of the annular laser beam by the flying body generating method according to claim 8; and transferring the light absorbing material flown, to a transfer medium.

10. A three-dimensional object producing method comprising:

flying the light absorbing material in the emitting direction of the annular laser beam by the flying body generating method according to claim 8;
transferring the light absorbing material flown, to a transfer medium; and
curing the light absorbing material transferred,
wherein the three-dimensional object producing method repeats transferring the light absorbing material to the light absorbing material cured, and curing the light absorbing material.

11. The flying body generating method according to claim 8, wherein energy, Q, that the annular laser beam applies to the surface of the base material to fly the light absorbing material during the irradiating step satisfies formula (1) below:

$$Q \geq Tb(v \cdot c \cdot \rho) \quad \text{Formula (1)}$$

wherein v represents volume in a unit of kg, c represents specific heat in a unit of J/(kg·K), and $\rho$ represents density in a unit of kg/m$^3$, and Tb represents a risen temperature at which a light absorbing material in a room temperature environment starts to vaporize in a unit of K.

\* \* \* \* \*